(12) United States Patent
Suh et al.

(10) Patent No.: US 7,580,490 B2
(45) Date of Patent: Aug. 25, 2009

(54) APPARATUS AND METHOD FOR CHANNEL ESTIMATION IN AN ORTHOGONAL FREQUENCY DIVISION MULTIPLEXING CELLULAR COMMUNICATION SYSTEM USING MULTIPLE TRANSMIT ANTENNAS

(75) Inventors: Chang-Ho Suh, Seongnam-si (KR);
Chan-Soo Hwang, Yongin-si (KR);
Seok-Hyun Yoon, Suwon-si (KR);
Young-Kwon Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 738 days.

(21) Appl. No.: 11/110,037

(22) Filed: Apr. 20, 2005

(65) Prior Publication Data

US 2005/0249319 A1  Nov. 10, 2005

(30) Foreign Application Priority Data

Apr. 21, 2004  (KR)  .................... 10-2004-0027630

(51) Int. Cl.
*H04B 14/04* (2006.01)

(52) U.S. Cl. .................... 375/349; 375/346; 375/260; 455/63.1; 455/278.1

(58) Field of Classification Search .............. 375/130, 375/140, 147, 148, 259, 260, 316, 346, 348–349; 455/403, 422.1, 436, 443, 130, 269, 280–284
See application file for complete search history.

(56) References Cited

U.S. PATENT DOCUMENTS 6,650,616 B2  11/2003  Crawford 6,654,431 B1  11/2003  Barton et al.

(Continued)

FOREIGN PATENT DOCUMENTS

EP  1 276 288  1/2007

(Continued)

OTHER PUBLICATIONS

Changho Suh et al., Channel Estimation Technique for Mitigating ICI in MIMO-OFDM Cellular Systems, 2004 Global Telecommunications Conference, Nov. 29, 2004, pp. 2679-2683.

(Continued)

*Primary Examiner*—Shuwang Liu
*Assistant Examiner*—James M Perez
(74) *Attorney, Agent, or Firm*—The Farrell Law Firm, LLP

(57) ABSTRACT

An apparatus and method for channel estimation using preamble signals received from a serving Node B and neighboring Node Bs each having N ($\geq$1) transmit antennas in a UE having M ($\geq$1) receive antennas in a broadband wireless communication system. In the channel estimation apparatus, a Node B number decider calculates the maximum number $N_S$ of channel-estimatable Node Bs using a preamble length, the number of antennas in each of the Node Bs, and the number of multiple paths. A multi-cell preamble matrix generator generates a multi-cell preamble matrix $x_S$ by generating a Node B preamble matrix for each of the Node Bs and selecting $N_S$ Node B preamble matrices according to reception power among the Node B preamble matrices. A channel estimator performs a channel estimation using $x_S$ and signals received through the M antennas during a preamble receiving period.

20 Claims, 20 Drawing Sheets

U.S. PATENT DOCUMENTS

| | | |
|---|---|---|
| 2002/0122381 A1 | 9/2002 | Wu et al. |
| 2002/0181390 A1 | 12/2002 | Mody et al. |
| 2003/0026197 A1 | 2/2003 | Crawford |
| 2003/0053524 A1* | 3/2003 | Dent ........................... 375/148 |
| 2005/0111408 A1* | 5/2005 | Skillermark et al. ........ 370/331 |

FOREIGN PATENT DOCUMENTS

| | | |
|---|---|---|
| FR | 2 830 389 | 10/2001 |
| GB | 2 353 181 A | 2/2001 |
| RU | 2 138 909 | 9/1993 |
| RU | 2 160 967 | 6/1996 |
| WO | WO 02/05442 | 1/2002 |

OTHER PUBLICATIONS

Changho Suh et al., Comparative Study of Time-Domain and Frequency-Domain Channel Estimation in MIMO-OFDM Systems, 14$^{th}$ IEEE 2003 International Symposium on Personal, Indoor and Mobile Radio Communications, pp.1 1095-1099.

Changho Suh et al., Preamble Design for Channel Estimation in MIMO-OFDM Systems, 2003 IEEE Global Telecommunications Conference, Dec. 1, 2003, pp. 317-321.

* cited by examiner

APPARATUS AND METHOD FOR CHANNEL ESTIMATION IN AN ORTHOGONAL FREQUENCY DIVISION MULTIPLEXING CELLULAR COMMUNICATION SYSTEM USING MULTIPLE TRANSMIT ANTENNAS

PRIORITY

This application claims priority under 35 U.S.C. § 119 to an application entitled "Apparatus And Method For Channel Estimation In An Orthogonal Frequency Division Multiplexing Cellular Communication System Using Multiple Transmit Antennas" filed in the Korean Intellectual Property Office on Apr. 21, 2004 and assigned Ser. No. 2004-27630, the contents of which are herein incorporated by reference.

BACKGROUND OF THE INVENTION

1. Field of the Invention

The present invention relates generally to a channel estimation apparatus and method in an OFDM (Orthogonal Frequency Division Multiplexing) communication system, and in particular, to an apparatus and method for performing accurate channel estimation by canceling inter-cellular interference in a MIMO (Multiple Input Multiple Output)-OFDM communication system.

2. Description of the Related Art

Typically, a wireless communication system refers to a system supporting wireless communication service, which includes Node Bs and UEs (User Equipment). The Node B and the UE support the wireless communication service in transmission frames. For frame transmission and reception, therefore, synchronization must be acquired between a Node B and a UE. Accordingly, the Node B transmits a synchronization signal to the UE, such that the UE can identify the start of a frame. The UE then detects the frame timing of the Node B from the synchronization signal and demodulates a received frame based on the frame timing. In general, the synchronization signal is a preamble sequence preset between the Node B and the UE.

Preferably, a multi-carrier OFDM communication system uses a preamble sequence having a low PAPR (Peak-to-Average Power Ratio). The Node B transmits to the UE the first part of a long preamble for coarse synchronization, followed by a short preamble for fine synchronization. The UE transmits only a short preamble to the Node B, for fine synchronization.

The OFDM communication system transmits user data to a plurality of users, i.e., UEs, by multiplexing a frame in time. Simultaneously, a frame preamble is transmitted for a predetermined time period starting from the start of a frame, to indicate the start of the frame. Because of burst data transmission to users in one frame, a burst preamble exists in front of each user data in order to indicate the start of the data. Therefore, the UE receives the data preamble to determine the start of its user data. More specifically, to synchronize it's timing to the start of data for data reception, the UE receives a common preamble sequence in the system and acquires synchronization, prior to signal reception.

The OFDM communication system uses the same source coding, channel coding, and modulation as non-OFDM communication systems. Compared to a CDMA (Code Division Multiple Access) communication system in which data is spread prior to transmission, the OFDM communication system inserts a guard interval into an IFFT (Inverse Fast Fourier Transform) signal. Therefore, the OFDM communication system can transmit a broadband signal with simple hardware relative to the CDMA communication system. The OFDM communication system IFFT-processes a modulated bit-symbol sequence, thereby producing a time-domain signal. The time-domain signal (i.e. OFDM symbol) is a broadband signal in which a plurality of narrow-band subcarrier signals are multiplexed. A plurality of modulated symbols are delivered for one OFDM symbol period.

However, simple transmission of an IFFT OFDM symbol without any further processing leads to inevitable interference between the previous OFDM symbol and the present OFDM symbol. To cancel the ISI (Inter-Symbol Interference), a guard interval is inserted. It was proposed that null data is to be inserted for a predetermined interval as the guard interval. The distinctive shortcoming of this guard interval is that for an incorrect estimation of the start of the OFDM symbol at the receiver, interference occurs between subcarriers, increasing the wrong decision probability of the received OFDM symbol. Therefore, the guard interval is used in form of a "cyclic prefix" or "cyclic postfix". The cyclic prefix is a copy of the last 1/n bits of a time-domain OFDM symbol, inserted into an effective OFDM symbol, and the cyclic postfix is a copy of the first 1/n bits of the time-domain OFDM symbol, inserted into the effective OFDM symbol. Utilizing the guard interval as the redundant information of the copied first or last part of one OFDM symbol, the receiver can acquire the time/frequency synchronization of a received OFDM symbol.

A signal transmitted from the transmitter is distorted as it experiences a radio channel and thus the distorted signal arrives at the receiver. The receiver performs channel estimation by acquiring time/frequency synchronization using a known preamble sequence, and channel-compensates frequency-domain FFT (Fast Fourier Transform) symbols using the channel estimate. The receiver then recovers information data by channel decoding and source decoding the channel-compensated symbols in correspondence with the channel coding and source coding used in the transmitter.

The OFDM communication system uses a preamble sequence to achieve frame timing synchronization, frequency synchronization, and channel estimation. Although a guard interval and pilot subcarriers can be used instead of the preamble in frame timing synchronization, frequency synchronization, and channel estimation, the transmitter usually transmits known symbols at the start of every frame or data burst as a preamble sequence and the receiver updates time/frequency/channel information with the preamble sequence.

The importance of channel estimation lies in coherent modulation and demodulation in the OFDM system. A channel estimator is a required for systems using coherent modulation and demodulation. Especially under a MIMO environment, channel information is needed for every antenna, further increasing the importance of the channel estimation.

When the MIMO-OFDM system supports a cellular environment, severe interference occurs at cell boundaries, thereby degrading channel estimation performance. Accordingly, a need exists for channel estimation techniques that minimize inter-cellular interference in the MIMO-OFDM cellular system.

SUMMARY OF THE INVENTION

Accordingly, the present invention has been designed to substantially solve at least the above problems and/or disadvantages and to provide at least the advantages below. An object of the present invention is to provide an apparatus and method for performing accurate channel estimation by canceling inter-cellular interference in an OFDM communication system.

Another object of the present invention is to provide an apparatus and method for performing accurate channel estimation by canceling inter-cellular interference in a wireless cellular communication system.

A further object of the present invention is to provide an apparatus and method for determining a number of channel-estimatable Node Bs (or cells) in a wireless cellular communication system.

The above and other objects are achieved by providing an apparatus and method for channel estimation in an OFDM cellular communication system using multiple antennas.

According to one aspect of the present invention, in an apparatus for channel estimation using preamble signals received from a serving Node B and neighboring Node Bs in a UE in a broadband wireless communication system in which each of the Node Bs transmits a signal through N ($\geq 1$) antennas and the UE receives a signal through M ($\geq 1$) antennas, a Node B number decider calculates the maximum number $N_S$ of channel-estimatable Node Bs using a preamble length, the number of antennas in each of the Node Bs, and the number of multiple paths. A multi-cell preamble matrix generator generates a multi-cell preamble matrix $x_S$ by generating a Node B preamble matrix for each of the serving Node B and the neighboring Node Bs and selecting $N_S$ Node B preamble matrices according to reception power among the generated Node B preamble matrices. A channel estimator performs a channel estimation using the multi-cell preamble matrix $x_S$ and M signals received through the M antennas during a preamble receiving period.

According to another aspect of the present invention, in an apparatus for channel estimation using preamble signals received from a serving Node B and neighboring Node Bs in a UE in a broadband wireless communication system where each of the Node Bs transmits a signal through N ($\geq 1$) antennas and the UE receives a signal through M ($\geq 1$) antennas, a Node B number decider calculates the maximum number $N_S$ of channel-estimatable Node Bs using a preamble length A, the number of antennas N in each of the Node Bs, and the number L of multiple paths by $$N_S = \left\lfloor \frac{A}{LN} \right\rfloor.$$

A channel estimator selects $N_S$ Node Bs according to the reception power of the serving Node B and the neighboring Node Bs and performs a channel estimation using known preamble information associated with the $N_S$ Node Bs and signals received through the M antennas.

According to a further aspect of the present invention, in a method of channel estimation using preamble signals received from a serving Node B and neighboring Node Bs in a UE in a broadband wireless communication system where each of the Node Bs transmits a signal through N ($\geq 1$) antennas and the UE receives a signal through M ($\geq 1$) antennas, the maximum number $N_S$ of channel-estimatable Node Bs is calculated using a preamble length, the number of antennas in each of the Node Bs, and the number of multiple paths. $N_S$ Node Bs are selected according to the reception power of the serving Node B and the neighboring Node Bs, Node B preamble matrices are generated for the respective selected $N_S$ Node Bs, and a multi-cell preamble matrix $x_S$ is generated by combining the $N_S$ Node B preamble matrices. A channel estimation is then performed using the multi-cell preamble matrix $x_S$ and M signals received through the M antennas during a preamble receiving period.

According to still another aspect of the present invention, in a method of channel estimation using preamble signals received from a serving Node B and neighboring Node Bs in a UE in a broadband wireless communication system where each of the Node Bs transmits a signal through N ($\geq 1$) antennas and the UE receives a signal through M ($\geq 1$) antennas, the maximum number $N_S$ of channel-estimatable Node Bs is calculated using a preamble length A, the number of antennas N in each of the Node Bs, and the number L of multiple paths by $$N_S = \left\lfloor \frac{A}{LN} \right\rfloor.$$

$N_S$ Node Bs are selected according to the reception power of the serving Node B and the neighboring Node Bs and a channel estimation is performed using known preamble information associated with the $N_S$ Node Bs and signals received through the M antennas.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described herein below with reference to the accompanying drawings. In the following description, well-known functions or constructions are not described in detail because they would obscure the invention in unnecessary detail.

The present invention is directed to an apparatus and method for performing accurate channel estimation by canceling inter-cellular interference at a receiver in a MIMO-OFDM cellular communication system. While the following description is made in the context of a MIMO-OFDM system by way of example, it is to be appreciated that the present invention is applicable to any system suffering inter-cellular interference.

Figure 1:
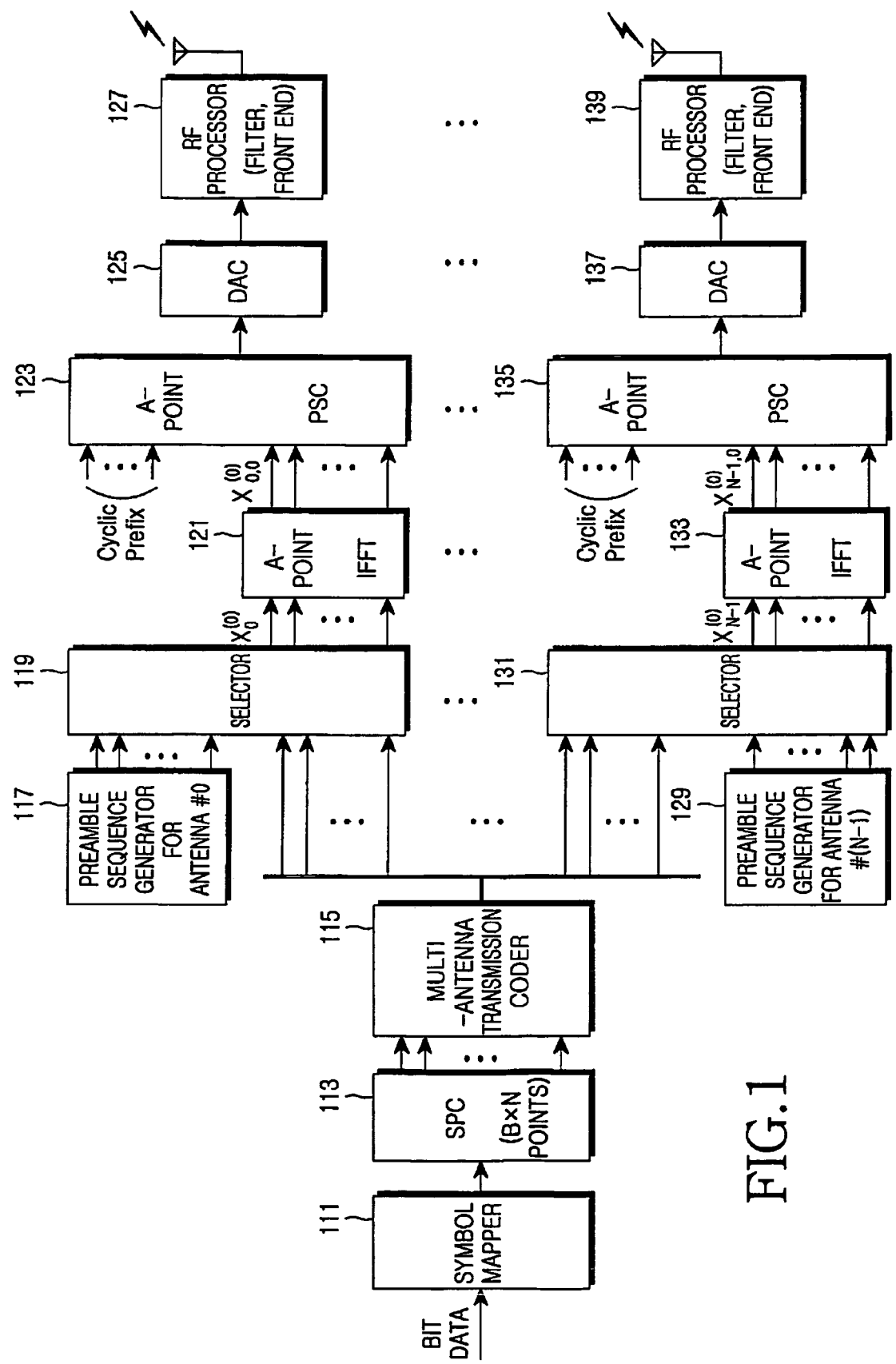
FIG. 1 is a block diagram illustrating a transmitter using N transmit antennas in an OFDM communication system according to an embodiment of the present invention.

FIG. 1 is a block diagram illustrating a transmitter using N transmit antennas in an OFDM communication system according to an embodiment of the present invention. Referring to FIG. 1, the transmitter includes a symbol mapper 111, a serial-to-parallel converter (SPC) 113, a multi-antenna transmission coder 115, N preamble sequence generators 117 to 129, N selectors 119 to 131, N IFFT processors 121 to 133, N parallel-to-serial converters (PSCs) 123 to 135, N digital-to-analog converters (DACs) 125 to 137, and N RF (Radio Frequency) processors 127 to 139.

In operation, the symbol mapper 111 encodes input information bits at a predetermined code rate and modulates the coded bits according to a predetermined modulation order. The symbol mapper 111 is configured to have a channel coder and a modulator. For example, the channel coder is a Turbo coder or a convolutional coder, and the modulator uses QPSK (Quadrature Phase Shift Keying), 8PSK (8-ary PSK), 16QAM (16-ary Quadrature Amplitude Modulation), or 64QAM (64-ary QAM).

The SPC 113 performs B×N-point serial-to-parallel conversion on the modulated symbols. B is the number of subcarriers for delivering data from each transmit antenna and N is the number of transmit antennas. Upon generation of B×N symbols for all the transmit antennas in the symbol mapper 111, the SPC 113 parallel converts the symbols.

The multi-antenna transmission coder 115 can be a space-time coder, a data multiplexer, or any other device according to its purposes. In general, the space-time coder is used for transmit antenna diversity, and the data multiplexer for increasing data capacity. The multi-antenna transmission coder 115 generates N antenna signals by encoding the modulated symbols in a predetermined coding method. and the N antenna signals are then provided them to the selectors 119 to 131, which are matched to the respective N antennas.

The preamble sequence generator 117 for antenna #0 generates a predetermined preamble sequence under the control of a controller (not shown), which will be described in great detail with reference to FIG. 3.

The selector 119 selects one of the preamble sequence received from the preamble sequence generator 117 and the antenna signal received from the multi-antenna transmission coder 115 according to scheduling at the moment. That is, the selector 119 determines whether to transmit the preamble sequence or the code symbols. According to the decision result, the selector 119 provides the preamble sequence or the symbols to the IFFT processor 121 for antenna #0.

The IFFT processor 121 A-point IFFT-processes the preamble sequence or the symbols. A is the total number of subcarriers for IFFT and B is the number of available subcarriers, not including DC (direct current) subcarriers and the subcarriers of an unused high frequency band.

The PSC 123 receives a cyclic prefix (CP) and the IFFT signals, and then serial converts the received signals. The DAC 125 converts the digital signal received from the PSC 123 to an analog signal. The RF processor 127, including a filter and a front-end unit, processes the analog signal to an RF signal and then transmits the RF signal through antenna #0.

The preamble sequence generator 129 for antenna #(N–1) generates a predetermined preamble sequence under the control of the controller (not shown). The selector 131 selects the preamble sequence received from the preamble sequence generator 129 or the antenna signal received from the multi-antenna transmission coder 115 according to the scheduling at the moment. That is, the selector 131 determines whether to transmit the preamble sequence or the code symbols. According to the decision result, the selector 131 provides the preamble sequence or the symbols to the IFFT processor 133 for antenna #(N–1).

The IFFT processor 133 A-point IFFT-processes the preamble sequence or the symbols. As described above, A is the total number of subcarriers for IFFT and B is the number of available subcarriers, not including DC (direct current) subcarriers and the subcarriers of an unused high frequency band.

The PSC 135 receives a CP and the IFFT signals, and the serial converts the received signals. The DAC 137 converts the digital signal received from the PSC 123 to an analog signal. The RF processor 139, including a filter and a front-end unit, processes the analog signal to an RF signal, and then transmits the RF signal through antenna #(N–1).

Figure 2:
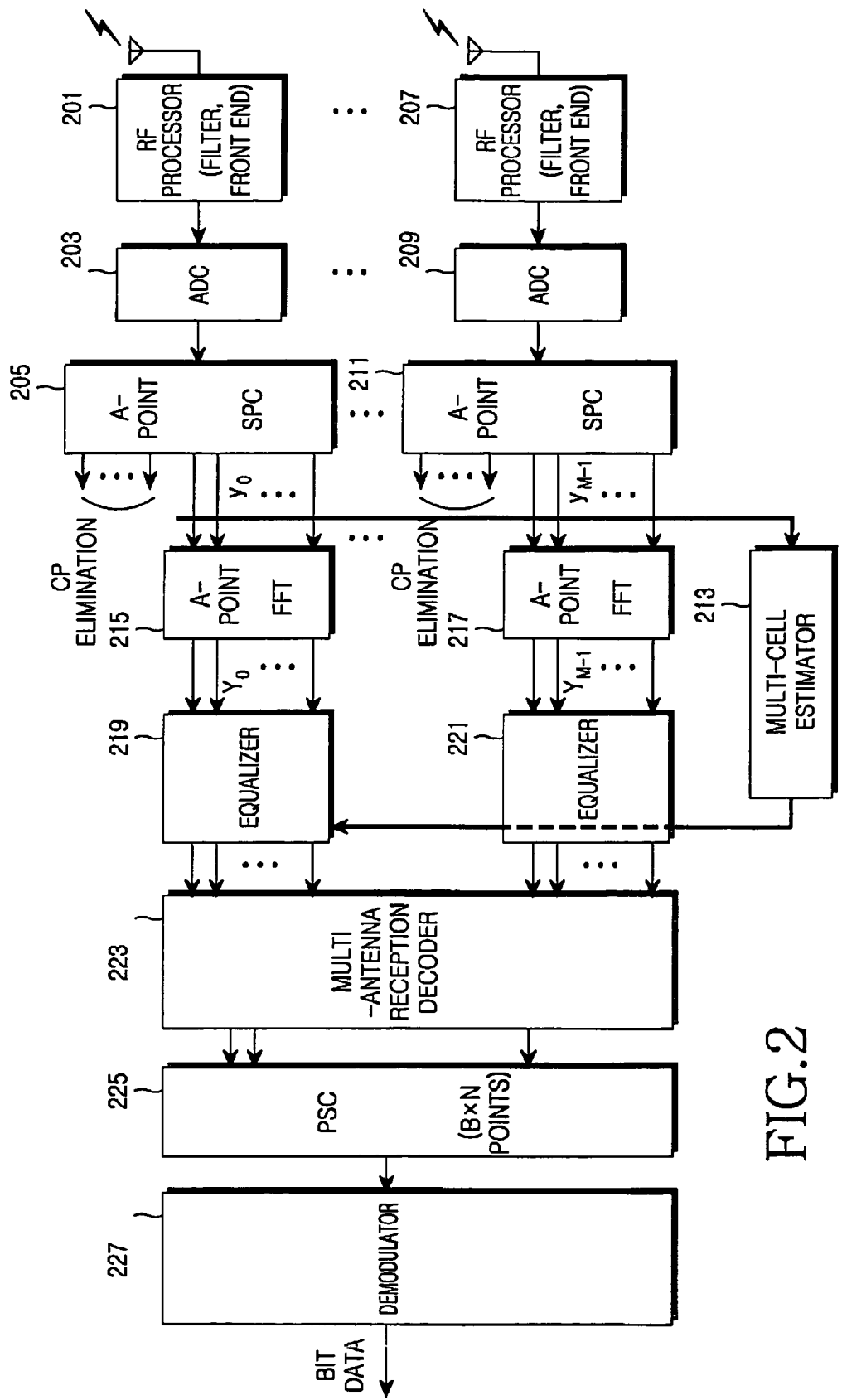
FIG. 2 is a block diagram illustrating a receiver using M receive antennas in an OFDM communication system according to an embodiment of the present invention.

FIG. 2 is a block diagram illustrating a receiver using M receive antennas in an OFDM communication system according to an embodiment of the present invention. Referring to FIG. 2, the receiver includes M receive antennas, M RF (Radio Frequency) processors 201 to 207, M analog-to-digital converters (ADCs) 203 to 209, M SPCs (Serial to Parallel Converters) 205 to 211, M FFT (Fast Fourier Transform) processors 215 to 217, a multi-cell channel estimator 213, M equalizers 219 to 221, a multi-antenna reception decoder 223, a PSC (Parallel to Serial Converter) 225, and a demodulator 227.

In operation, the RF processor 201 processes a signal received through antenna #0 through an RF filter and a front-end unit. The ADC 203 converts the analog signal received from the RF processor 210 to a digital signal. The SPC 205 removes CP samples from the digital signal, and parallel converts the remaining signal to signals $y_0(A\times 1)$ as an input to a digital end. Similarly, the SPC 211 outputs digital input signals $y_{M-1}(A\times 1)$ from antenna #(M−1).

At a preamble reception time, the received signals $y_0(A\times 1)$ to $y_{M-1}(A\times 1)$ are provided to the multi-cell estimator 213. The multi-cell estimator 213 estimates all possible M×N×L channels and provides the channel estimates to the equalizers 219 to 221. M is the number of the receive antennas, N is the number of the transmit antennas, and L is the number of multiple paths. The multi-cell channel estimator 213 will be described later in more detail with reference to FIG. 5.

At a non-preamble reception time, the received signals $y_0(A\times 1)$ to $Y_{M-1}(A\times 1)$ are provided to the FFT processors 215 to 217. The FFT processors 215 to 217 A-point FFT-process the received signals. The equalizers 219 to 221 compensate the FFT signals for channel distortion associated with the respective receive antennas using the channel estimates.

The multi-antenna reception decoder 223 decodes the channel-compensated signals to one signal stream according to a predetermined rule. The PSC 225 serializes the parallel data received from the multi-antenna reception decoder 223. Thereafter, the demodulator 225 recovers the original information bit stream by demodulating and decoding the serial data in a predetermined method.

Figure 3:
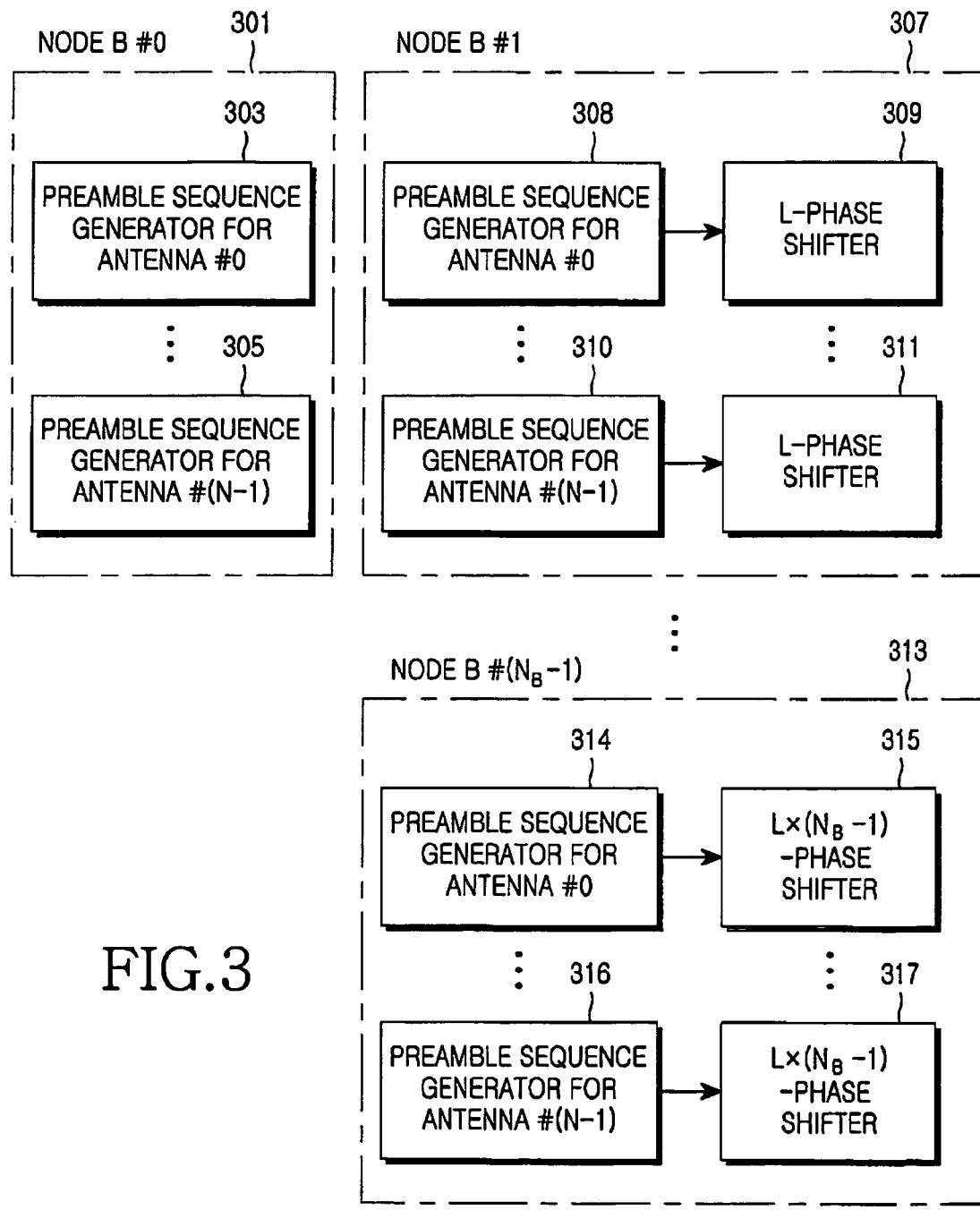
FIG. 3 illustrates a preamble transmission rule according to the present invention.

FIG. 3 illustrates a preamble transmission rule according to the present invention. The preamble sequence transmission rule is applied to $N_B$ Node Bs, including a serving Node B and its neighboring Node Bs, each Node B using N transmit antennas. Here, the serving Node B refers to a reference Node B for generating preamble sequences.

Referring to FIG. 3, a reference Node N 301 (Node B #0) is provided with N preamble sequence generators 303 to 305. The N preamble sequence generators 303 to 305 generate different preamble sequences in a predetermined method. The predetermined method can be to allocate different subcarriers to different transmit antennas. For example, if N is 2, for one antenna, a particular sequence is allocated to odd-numbered subcarriers with null data on even-numbered subcarriers among total subcarriers, while for the other antenna, the sequence is allocated to the even-numbered subcarriers with null data on the odd-numbered subcarriers.

A Node B 307 (Node B #1) has N preamble sequences 308 to 310 and N L-phase shifters 309 to 311. The N preamble sequence generators 308 to 310 generate the same N preamble sequences as in Node B #0 301. The L-phase shifters 309 to 311 then shift the phases of the preamble sequences received from their matched preamble sequence generators 308 to 310 by L, thereby producing final preamble sequences. L can be set to the length of the CP. The use of the L-phase shifters is a known technology for rendering the preambles of Node B #1 307 to be orthogonal to those of Node B #0 301.

Although the description of the present invention is based on the presumption of using the L-phase shifters, the preamble sequences can be generated in another suitable manner.

Similarly, a Node B 313 (Node B #($N_B$−1)) has N preamble sequences 314 to 316 and N Lx($N_B$−1)-phase shifters 325 to 317. The N preamble sequence generators 314 to 316 generate the same N preamble sequences as in Node B #0 301. The Lx($N_B$−1)-phase shifters 309 to 311 then shift the phases of the preamble sequences received from their matched preamble sequence generators 314 to 316 by Lx($N_B$−1), thereby producing final preamble sequences.

Figure 4:
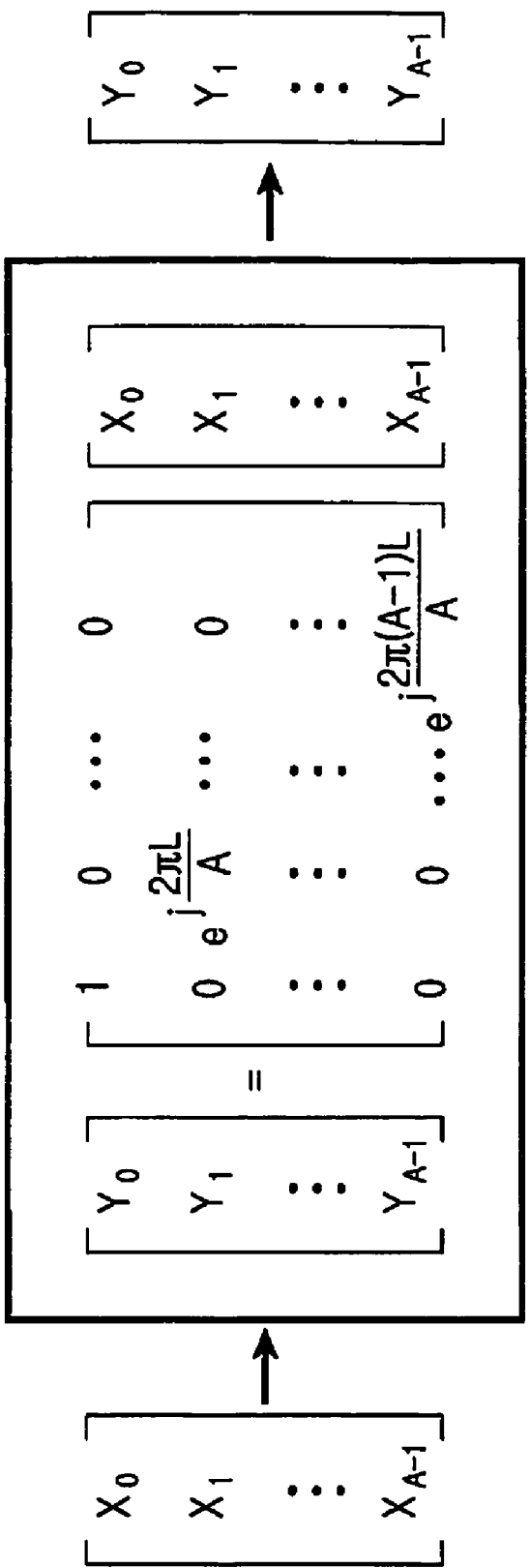
FIG. 4 illustrates the operational principle of an L-phase shifter needed for generation of a preamble sequence.

FIG. 4 illustrates an operational principle of L-phase shifters as illustrated in FIG. 3. Referring to FIG. 4, after L-phase shifting, the phase of a frequency-domain signal [$X_0$, $X_1$, ..., $X_{A-1}$] is shifted in the frequency domain. If the phase-shifted signal is IFFT-processed to a time-domain signal, it is then a cyclically-shifted signal. Because orthogonality is ensured between IFFT cyclically-shifted signals, usually, a phase-shifter is used in the frequency domain in generating preamble sequences.

Figure 5:
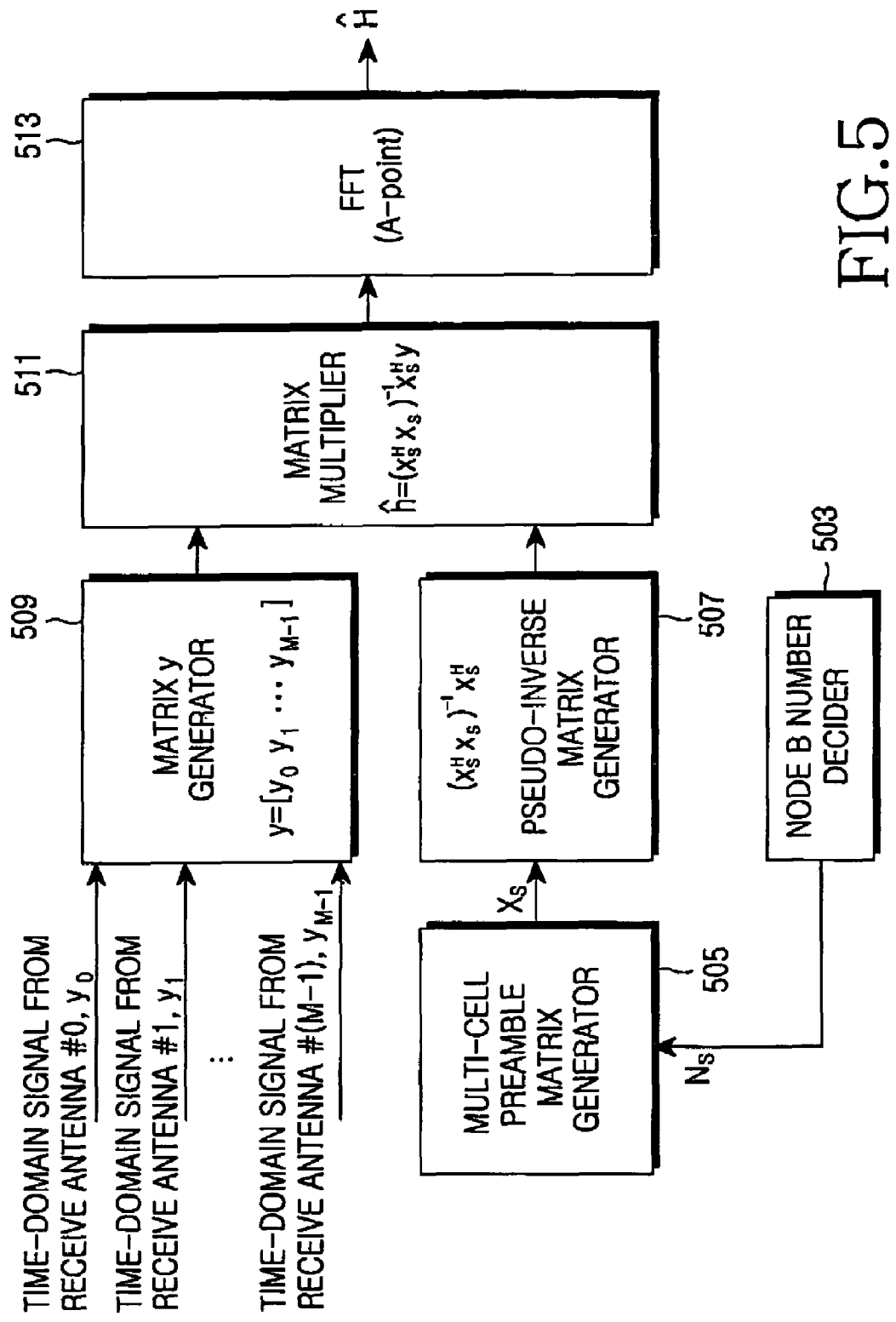
FIG. 5 is a detailed block diagram illustrating a multi-cell channel estimator in a receiver in a MIMO-OFDM communication system according to an embodiment of the present invention.

FIG. 5 is a detailed block diagram illustrating a multi-cell channel estimator in a receiver in a MIMO-OFDM communication system according to an embodiment of the present invention. Referring to FIG. 5, in a multi-cell channel estimator 213 as illustrated in FIG. 2, a Node B number decider 503 calculates a maximum number of accommodatable (or channel-estimatable) Node Bs, $N_S$. The preamble length is the size of IFFT/FFT (or OFDM symbol length), A in the present invention. Accordingly, $N_S$ is closely related to A, which will be described later in more detail with reference to FIG. 6.

A multi-cell preamble matrix generator 505 generates a multi-cell preamble matrix $x_S$ according to $N_S$ for direct use in multi-cell channel estimation, which will be described later in more detail with reference to FIG. 7.

A matrix y generator 509 generates a signal matrix y, as shown in Equation (1) below, by combining the time-domain signals received through the receive antennas, $y_0, y_1, \ldots y_{M-1}$. The received signals $y_0, y_1, \ldots y_{M-1}$ are the outputs of the SPCs 205 to 211 as illustrated in FIG. 2, received during a preamble time period.

$$y = [y_0\ y_1 \ldots y_{M-1}] \quad (1)$$

A pseudo-inverse matrix generator 507 calculates the pseudo-inverse of $x_S$, $(x_S^H x_S)^{-1} x_S^H$.

A matrix multiplier 511 multiplies y by $(x_S^H x_S)^{-1} x_S^H$, thereby producing a channel estimate ĥ, as shown in Equation (2) below, including N×M×L channel estimate values. In Equation (2), N is the number of transmit antennas, M is the number of receive antennas, and L is the number of multiple paths.

$$\hat{h} = (x_S^H x_S)^{-1} x_S^H y \quad (2)$$

An FFT processor 513 obtains a frequency-domain channel estimate Ĥ through A-point FFT-processing of ĥ. More specifically, the A-point FFT 513 FFT-processes L channel estimate values and outputs A channel estimate values (or subcarrier channel values), and repeats this operation N×M times. Accordingly, the FFT 513 eventually outputs N×M×A multi-path channel estimate values. Thereafter, Ĥ is provided to the equalizers 219 to 221, for channel compensation.

Depending on which channel estimation method is used, the channel estimate can be calculated by multiplying a pseudo-inverse matrix, or can be calculated in the frequency domain. In the present invention, the ML (Maximum Likelihood) method using pseudo-inverse matrix multiplication is used. The present invention calculates the multi-cell preamble matrix $x_S$ using $N_S$.

Figure 6:
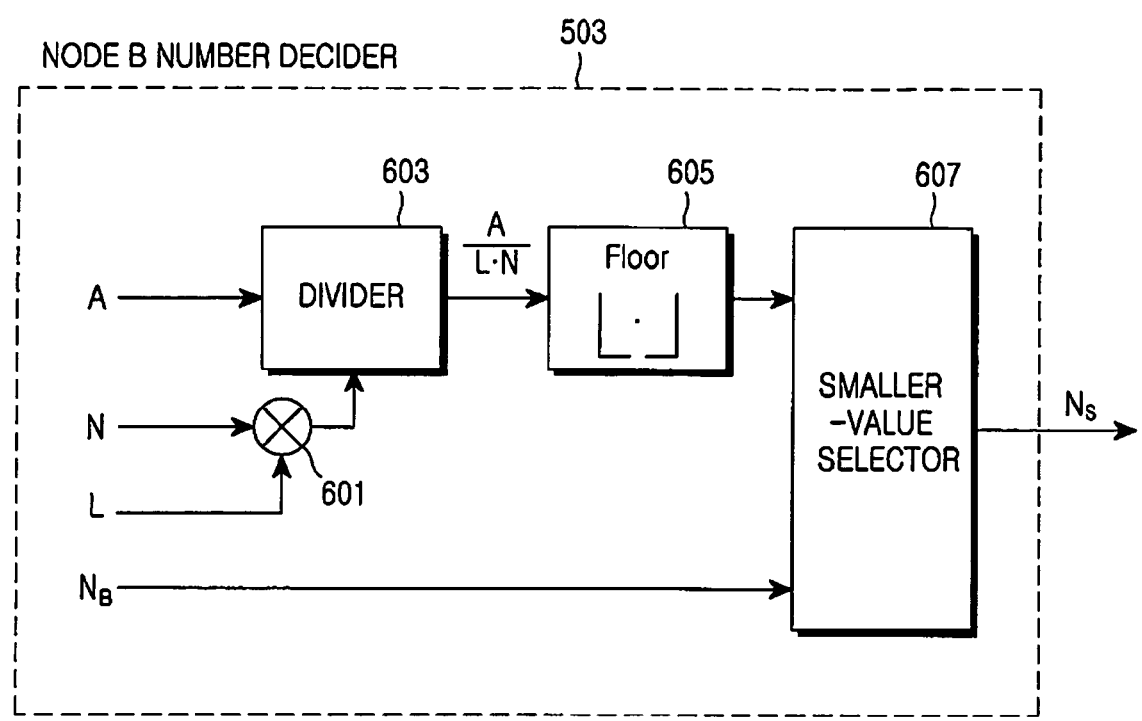
FIG. 6 is a detailed block diagram illustrating a Node B number decider as illustrated in FIG. 5.

FIG. 6 is a detailed block diagram illustrating a Node B number decider 503 as illustrated in FIG. 5. As described above, because the preamble length is limited to the length of an OFDM symbol, i.e., A, the number of channel-estimatable Node Bs is also limited. Also, the present invention assumes a channel environment with multiple paths such as a MIMO channel (or multi-cell) environment. Therefore, considering all these conditions, $N_S$ is computed by Equation (3), $$N_S = \min\left(\left\lfloor \frac{A}{LN} \right\rfloor, N_B\right) \quad (3)$$

where A is the IFFT size, i.e. the preamble length, L is the number of multiple paths, i.e. the Cyclic Prefix length, N is the number of transmit antennas, and $N_B$ is the number of a serving Node B plus its neighboring Node Bs.

$$\left\lfloor \frac{A}{LN} \right\rfloor$$

represents the number of channel-estimatable Node Bs. L, representing a maximum delay spread or a maximum channel length, is computed as the difference between the time of arrival from the earliest path and the time of arrival from the last path, expressed in the number of samples.

In the OFDM system, the CP length expressed as the number of samples is typically determined using the maximum delay spread. The present invention also assumes that L is the CP length expressed in the number of samples.

As noted from Equation (3), when $N_B$ is less than $$\left\lfloor \frac{A}{LN} \right\rfloor,$$

$N_B$ is $N_S$. However, when $N_B$ is larger than $$\left\lfloor \frac{A}{LN} \right\rfloor, \left\lfloor \frac{A}{LN} \right\rfloor$$

is $N_S$. This computation can be implemented in hardware as illustrated in FIG. 6.

Referring to FIG. 6, a multiplier 601 multiplies L by N. A divider 603 divides A by the product of L×N. A floor operator 605 outputs only the integer part of $$\frac{A}{LN},$$

deleting the fraction part. A smaller-value selector 607 selects the smaller of the output of the floor operator 605 and $N_B$ as $N_S$.

Figure 7:
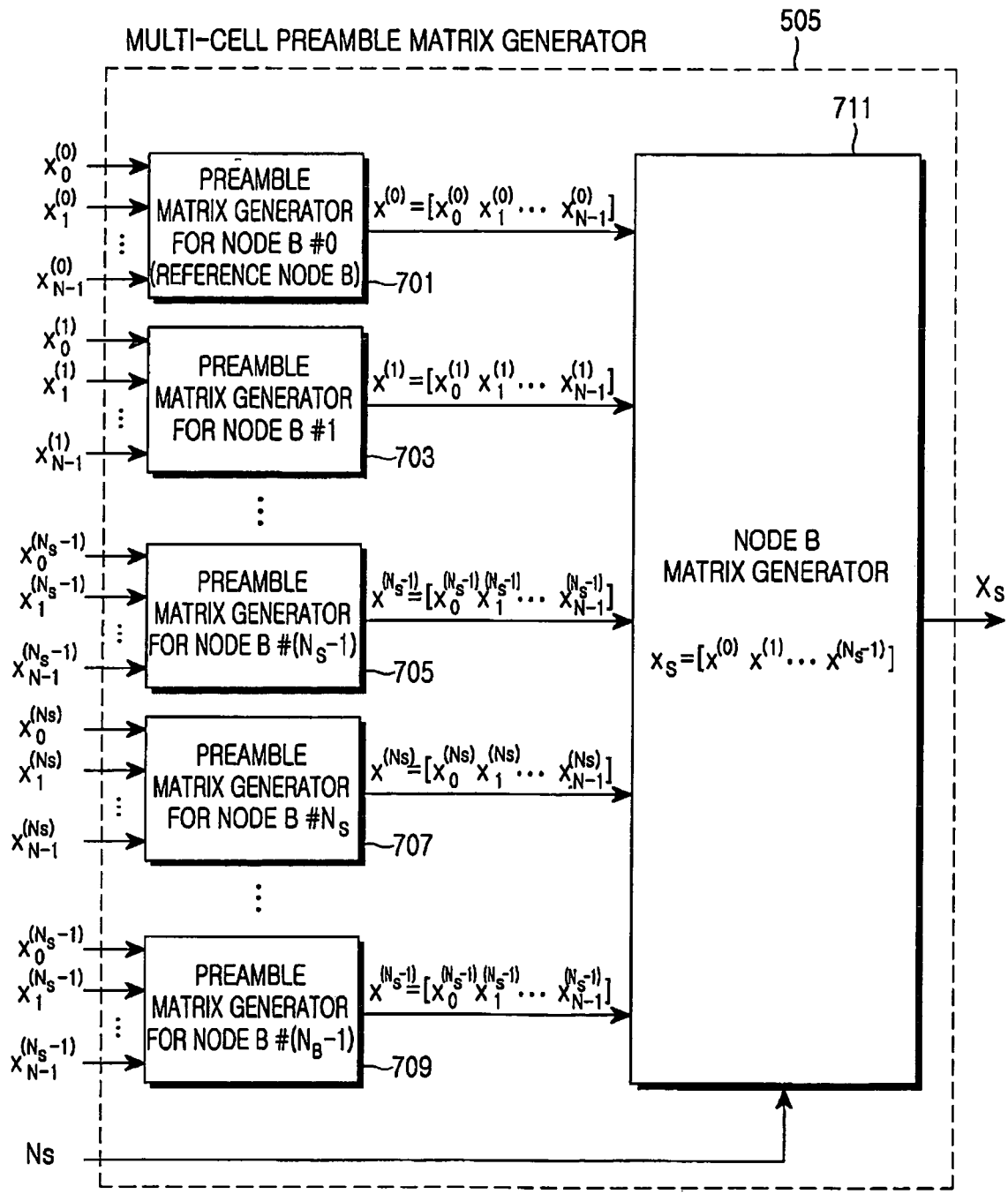
FIG. 7 is a detailed block diagram illustrating a multi-cell preamble matrix generator as illustrated in FIG. 5.

FIG. 7 is a detailed block diagram illustrating a multi-cell preamble matrix generator 505 as illustrated in FIG. 5. Referring to FIG. 7, a preamble matrix generator 701 for Node B #0 (the serving Node B) generates a preamble matrix for Node B #0, $x^{(0)}=[x_0^{(0)} x_1^{(0)} \ldots x_{N-1}^{(0)}]$ using known frequency-domain preamble information associated with all transmit antennas of Node B #0, $X_0^{(0)}, \ldots, X_{N-1}^{(0)}$, which will be described later in more detail with reference to FIG. 8.

A preamble matrix generator 703 for Node B #1 generates a preamble matrix for Node B #1, $x^{(1)}=[x_0^{(1)} x_1^{(1)} \ldots x_{N-1}^{(1)}]$ using known frequency-domain preamble information associated with all transmit antennas of Node B #1, $X_0^{(1)}, \ldots, X_{N-1}^{(1)}$.

Similarly, a preamble matrix generator 705 for Node B #($N_S-1$) generates a preamble matrix for Node B #($N_s-1$), $x^{(N_S-1)}=[x_0^{(N_S-1)} x_1^{(N_S-1)} \ldots x_{N-1}^{(N_S-1)}]$, and a preamble matrix generator 709 for Node B #($N_B-1$) generates a preamble matrix for Node B #($N_B-1$), $x^{(N_B-1)}=[x_0^{(N_B-1)} x_1^{(N_B-1)} \ldots x_{N-1}^{(N_B-1)}]$.

To increases channel estimation performance, a Node B for which channel estimation is performed must have greater power than other Node Bs. Therefore, the Node Bs are indexed in the order expressed as shown in Equation (4). In the above example, Node B #0 is highest and Node B #($N_B-1$) is lowest in reception power.

$$p^{(0)} \geq p^{(1)} \geq \ldots \geq p^{(N_B-1)} \quad (4)$$

An accommodatable Node B matrix generator 711 then receives $N_S$ from the Node B number decider 503 and selects $N_S$ Node B preamble matrices, thereby generating the multi-cell preamble matrix $x_S=[x^{(0)} x^{(1)} \ldots x^{(N_S-1)}]$.

Figure 8:
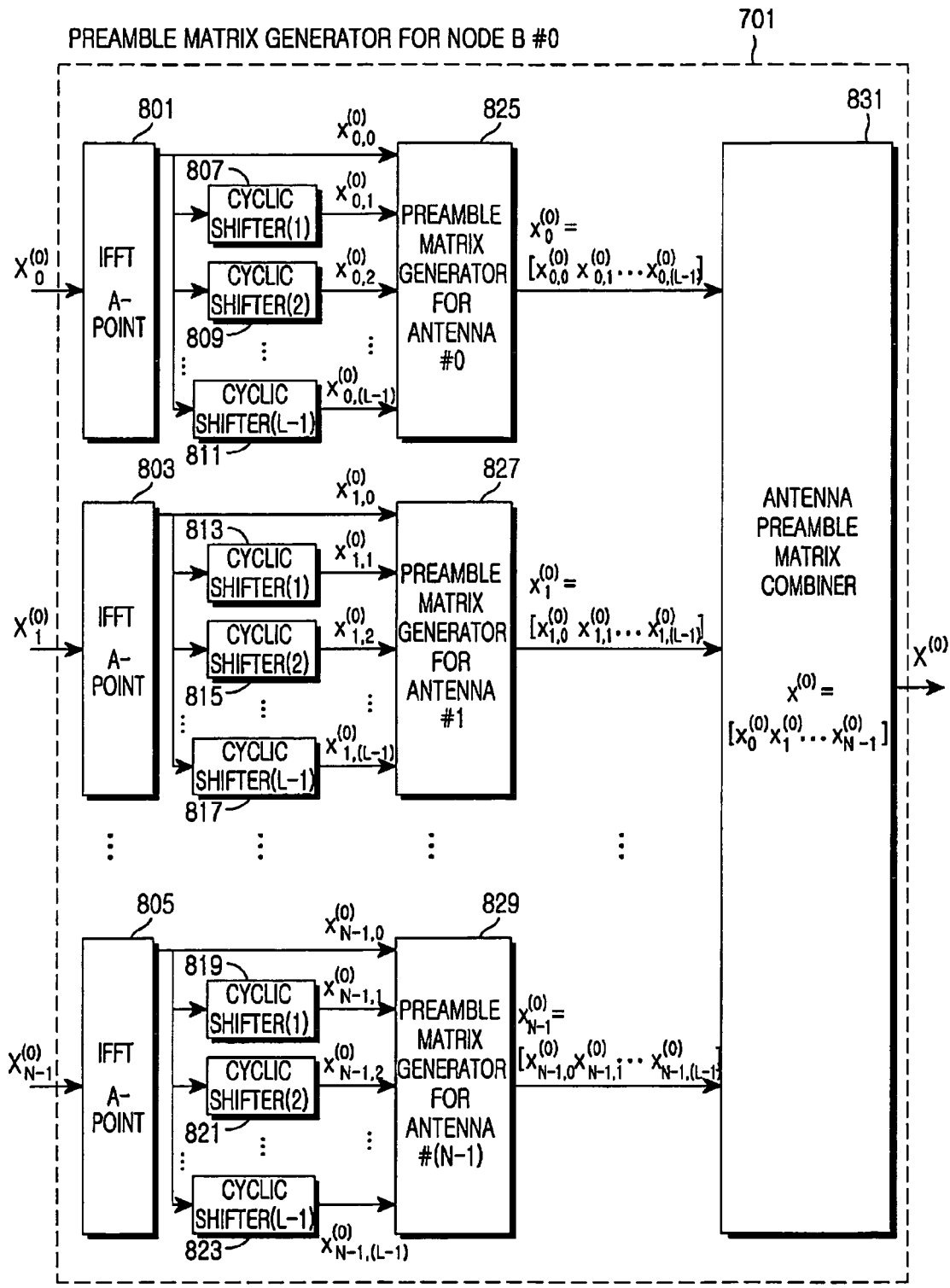
FIG. 8 is a detailed block diagram illustrating a preamble matrix generator for Node B #0 as illustrated in FIG. 7.

FIG. 8 is a detailed block diagram illustrating a preamble matrix generator 701 for Node B #0 as illustrated in FIG. 7. Referring to FIG. 8, for Node B #0 (the serving Node B), an A-point IFFT 801 generates a time-domain signal $x_{0,0}^{(0)}$ by IFFT-processing a preamble signal $X_0^{(0)}$ for transmit antenna #0. $x_{0,0}^{(0)}$ is input to a preamble matrix generator 825 for antenna #0 and cyclic shifters 807 to 811.

The cyclic shifter 807 cyclically shifts $x_{0,0}^{(0)}$, for example, once, and outputs the resulting signal $x_{0,1}^{(0)}$ to the preamble matrix generator 825 for antenna #0. The cyclic shifter 809 cyclically shifts $x_{0,0}^{(0)}$, for example, twice, and outputs the resulting signal $x_{0,2}^{(0)}$ to the preamble matrix generator 825 for antenna #0. Finally, the cyclic shifter 811 cyclically shifts $x_{0,0}^{(0)}$ (L−1) times and outputs the resulting signal $x_{0,(L-1)}^{(0)}$ to the preamble matrix generator 825 for antenna #0. Accordingly, preamble signals are generated for all paths for antenna #0.

The preamble matrix generator 825 for antenna #0 generates a preamble matrix for antenna #0, $x_0^{(0)}=[x_{0,0}^{(0)} x_{0,1}^{(0)} \ldots x_{0,(L-1)}^{(0)}]$ by combining the outputs of the IFFT processor 801 and the cyclic shifters 807 to 811. The preamble matrix for antenna #0 is shown in Equation (5), $$x_0^{(0)} = [x_{0,0}^{(0)} x_{0,1}^{(0)} \ldots x_{0,(L-1)}^{(0)}] \quad (5)$$

$$= \begin{bmatrix} x_0^{(0)}(0) & x_0^{(0)}(A-1) & \cdots & x_0^{(0)}(A-L+1) \\ x_0^{(0)}(1) & x_0^{(0)}(0) & \cdots & x_0^{(0)}(A-L+2) \\ \vdots & \vdots & \ddots & \vdots \\ x_0^{(0)}(A-1) & x_0^{(0)}(A-2) & \cdots & x_0^{(0)}(A-L) \end{bmatrix}$$

where $x_i^{(j)}(k)$ is a $k^{th}$ sample value of a preamble transmitted from an $i^{th}$ antenna of a $j^{th}$ Node B.

Similarly, a preamble matrix generator 827 for antenna #1 generates a preamble matrix for antenna #1, $x_1^{(0)}=[x_{1,0}^{(0)} x_{1,1}^{(0)} \ldots x_{1,(L-1)}^{(0)}]$ and outputs it to an antenna preamble matrix combiner 831. A preamble matrix generator 829 for antenna #(N−1) generates a preamble matrix for antenna #(N−1), $x_{N-1}^{(0)}=[x_{N-1,0}^{(0)} x_{N-1,1}^{(0)} \ldots x_{N-1,(L-1)}^{(0)}]$ and outputs it to the antenna preamble matrix combiner 831.

The antenna preamble matrix combiner 831 generates the preamble matrix for Node B #0, $x^{(x)}=[_0^{(0)} x_1^{(0)} \ldots x_{N-1}^{(0)}]$ by combining N antenna preamble matrices received from the N antenna preamble matrix generators 825 to 829. The preamble matrix generators 703 to 709 for the other Node Bs, as illustrated in FIG. 7, generate preamble matrices for the respective Node Bs in the same manner. The preamble matrix generator for a Node B, as illustrated in FIG. 8, involves multi-path propagation in generating a preamble matrix for the Node B. In real implementation of a preamble matrix generator for a Node B, the UE preliminarily stores the preamble sample data of the Node B in a memory and cyclically shifts the preamble sample data when necessary, thereby generating a preamble matrix for the Node B.

For better understanding of the present invention, an exemplary application will be presented below.

Figure 9:
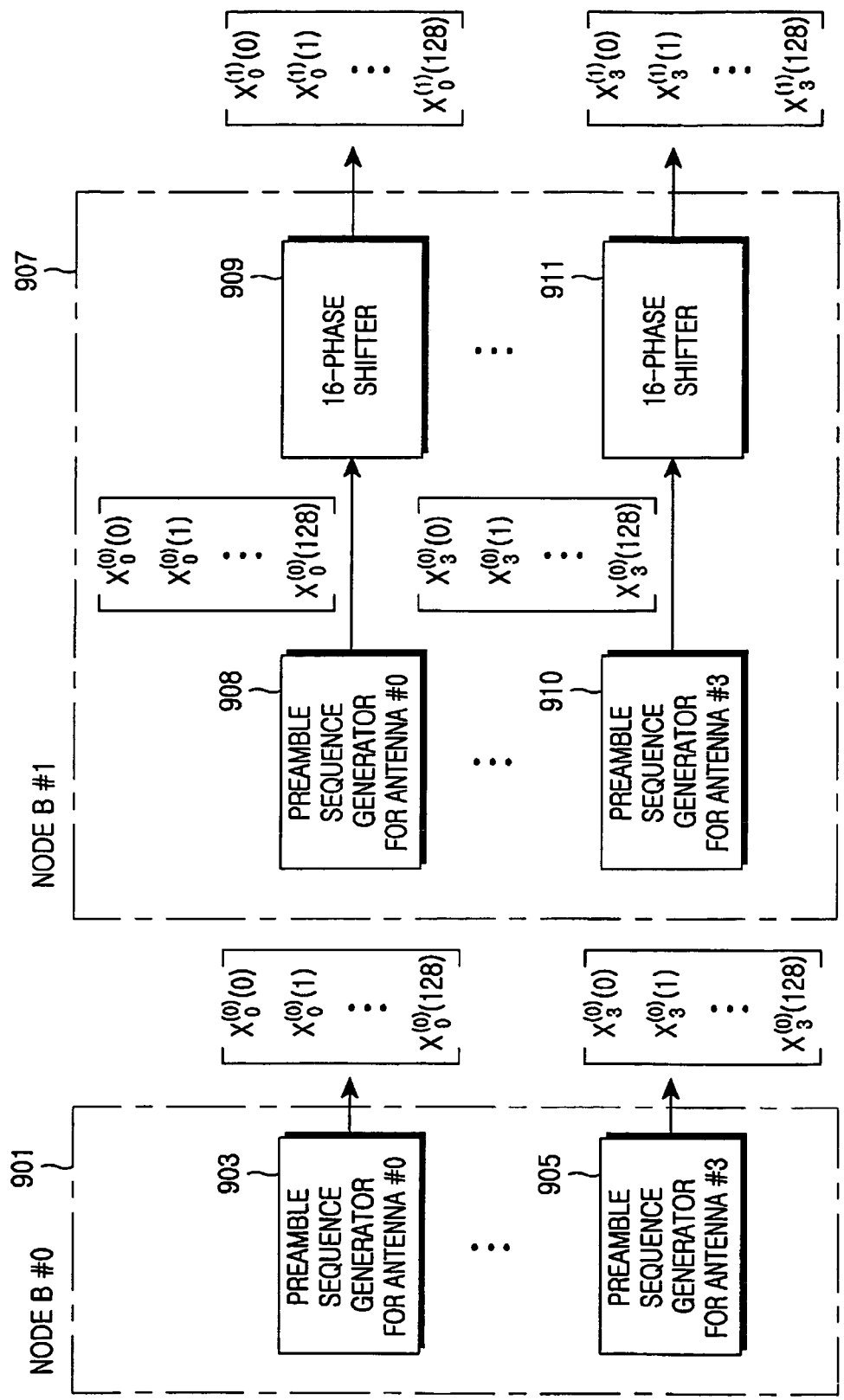
FIG. 9 illustrates a preamble sequence transmission rule for each Node B when the total number of a serving Node B and its neighboring Node Bs is 2 and the number of transmit antennas is 4.

FIG. 9 illustrates a preamble sequence transmission rule for each Node B when $N_B=2$ and $N=4$. Referring to FIG. 9, a serving Node B 901 (Node B #0) is provided with four preamble sequence generators 903 to 905. The preamble sequence generators 903 to 905 generate preamble sequences in a predetermined method. The predetermined method may allocate different subcarriers to different transmit antennas.

A Node B 907 (Node B #1) is provided with four preamble sequence generators 908 to 910 and four 16-phase shifters 909 to 911. The preamble sequence generators 908 to 910 generate the same four preamble sequences as in Node B #0. The 16-phase shifters 909 to 911 shift the preamble sequences by 16°, thereby generating final preamble sequences. The use of the phase shifters is a known technology for rendering the preambles of Node B #1 to be orthogonal to those of Node B #0.

As described above, the description of the present invention is based on the presumption of using the phase shifters, even though the preamble sequences can be generated in a different manner.

Figure 10:
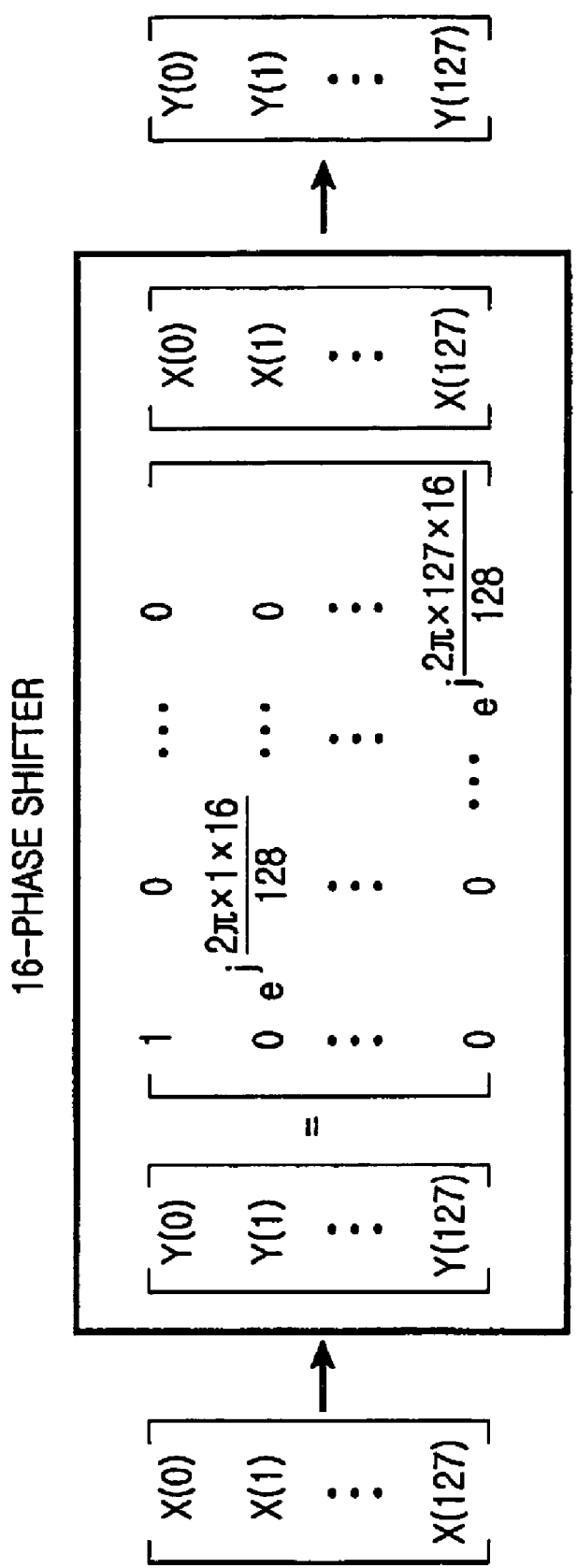
FIG. 10 illustrates an operational principle of 16-phase shifters as illustrated in FIG. 9.

FIG. 10 illustrates an operational principle of 16-phase shifters 907 to 911 as illustrated in FIG. 9. Referring to FIG. 10, after 16-phase shifting, the phase of a frequency-domain signal $[X_0, X_1, \ldots, X_{127}]$ is shifted in the frequency domain. If the phase-shifted signal is IFFT-processed to a time-domain signal, it is then a cyclically-shifted signal. Because orthogonality is ensured between IFFT cyclically-shifted signals, a phase-shifter is used in the frequency domain or a cyclic shifter is used in the time domain in generating preamble sequences.

Figure 11:
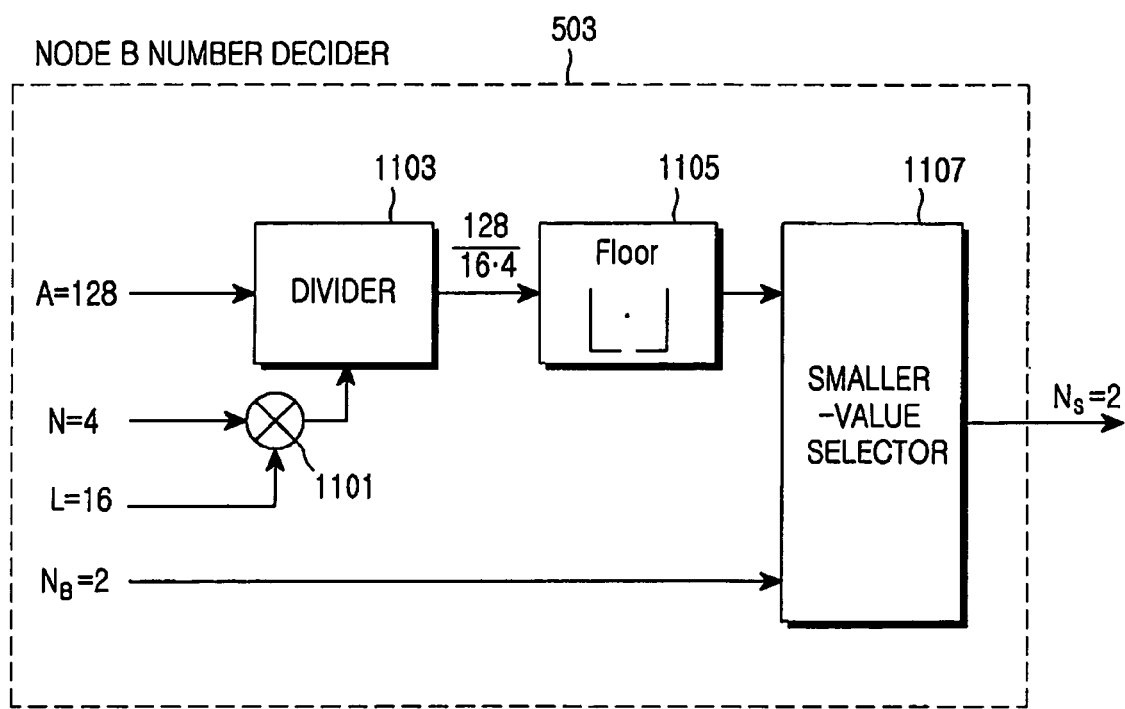
FIG. 11 illustrates an operation of a Node B number decider when a preamble length is 128, the number of transmit antennas is 4, the number of multiple paths is 16, and the total number of a serving Node B and its neighboring Node Bs is 2.

FIG. 11 illustrates an operation of the Node B number decider 503, when A=128, N=4, L=16, and NB=2. As described above, because L cannot be measured accurately, L is determined to be a CP length.

Under the above conditions, $N_S$ is computed using Equation (6).

$$N_S = \min\left(\left\lfloor \frac{128}{16 \times 4} \right\rfloor, 2\right) = 2 \tag{6}$$

As noted from Equation (6), when 2 ($=N_B$) is less than $$\left\lfloor \frac{128}{16 \times 4} \right\rfloor,$$

$N_S=2$. However, when 2 ($=N_B$) is larger than $$\left\lfloor \frac{128}{16 \times 4} \right\rfloor, N_S \text{ is } \left\lfloor \frac{128}{16 \times 4} \right\rfloor.$$

Preferably, this computation is implemented by hardware as illustrated in FIG. 11.

Referring to FIG. 11, a multiplier 1101 multiplies 16 (=L) by 4 (=N). A divider 1103 divides 128(=A) by the product of 16×4 (=L×N) by 128 (=A). A floor operator 1105 performs a floor operation on the output of the divider 1103. A smaller-value selector 1107 compares 2 being the output of the floor operator 1105 with 2 ($=N_B$), and outputs 2 as $N_S$.

Figure 12:
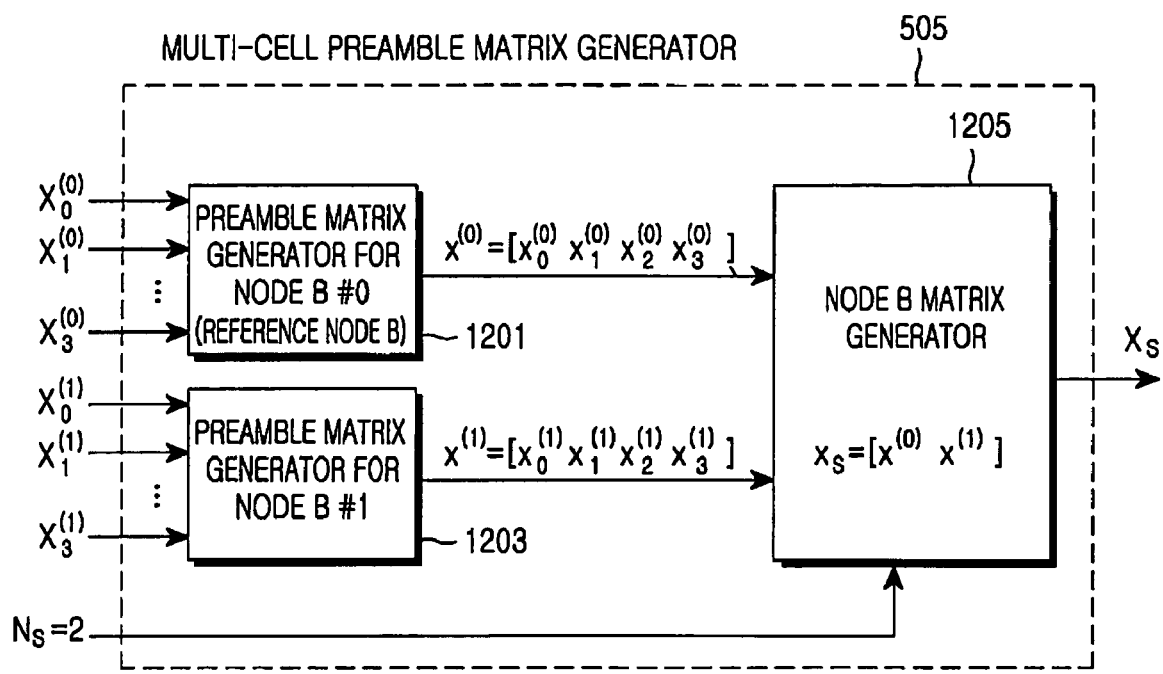
FIG. 12 illustrates an operation of a multi-cell preamble matrix generator when the number of transmit antennas is 4, the total number of a serving Node B and its neighboring Node Bs is 2, and the maximum number of accommodatable Node Bs is 2.

FIG. 12 illustrates an operation of the multi-cell preamble matrix generator 505 when N=4, $N_B=2$, and $N_S=2$. Referring to FIG. 12, a preamble matrix generator 1201 for Node B #0 (the serving Node B) generates a preamble matrix for Node B #0, $x^{(0)}=[x_1^{(0)} \ldots x_3^{(0)}]$ using known frequency-domain preamble information associated with four antennas of Node B #0, $X_0^{(0)}, \ldots X_3^{(0)}$, which will be described later in more detail with reference to FIG. 13.

A preamble matrix generator 1203 for Node B #1 generates a preamble matrix for Node B #1, $x^{(1)}=[x_0^{(1)} x_1^{(1)} \ldots x_3^{(1)}]$ using known frequency-domain preamble information associated with all transmit antennas of Node B #1, $X_0^{(1)}, \ldots X_3^{(1)}$.

To increases channel estimation performance, a Node B for which channel estimation is performed must have greater power than the other Node B. Therefore, the Node Bs are indexed in the order expressed in Equation (7).

$$p^{(0)} \geq p^{(1)} \tag{7}$$

A Node B matrix generator 1205 generates a multi-cell preamble matrix $x_s=[x^{(0)} x^{(1)}]$ by combining the two Node B preamble matrices from the preamble matrix generators 1201 and 1203 according to $N_S$ ($=2$) from the Node B number decider 503.

Figure 13:
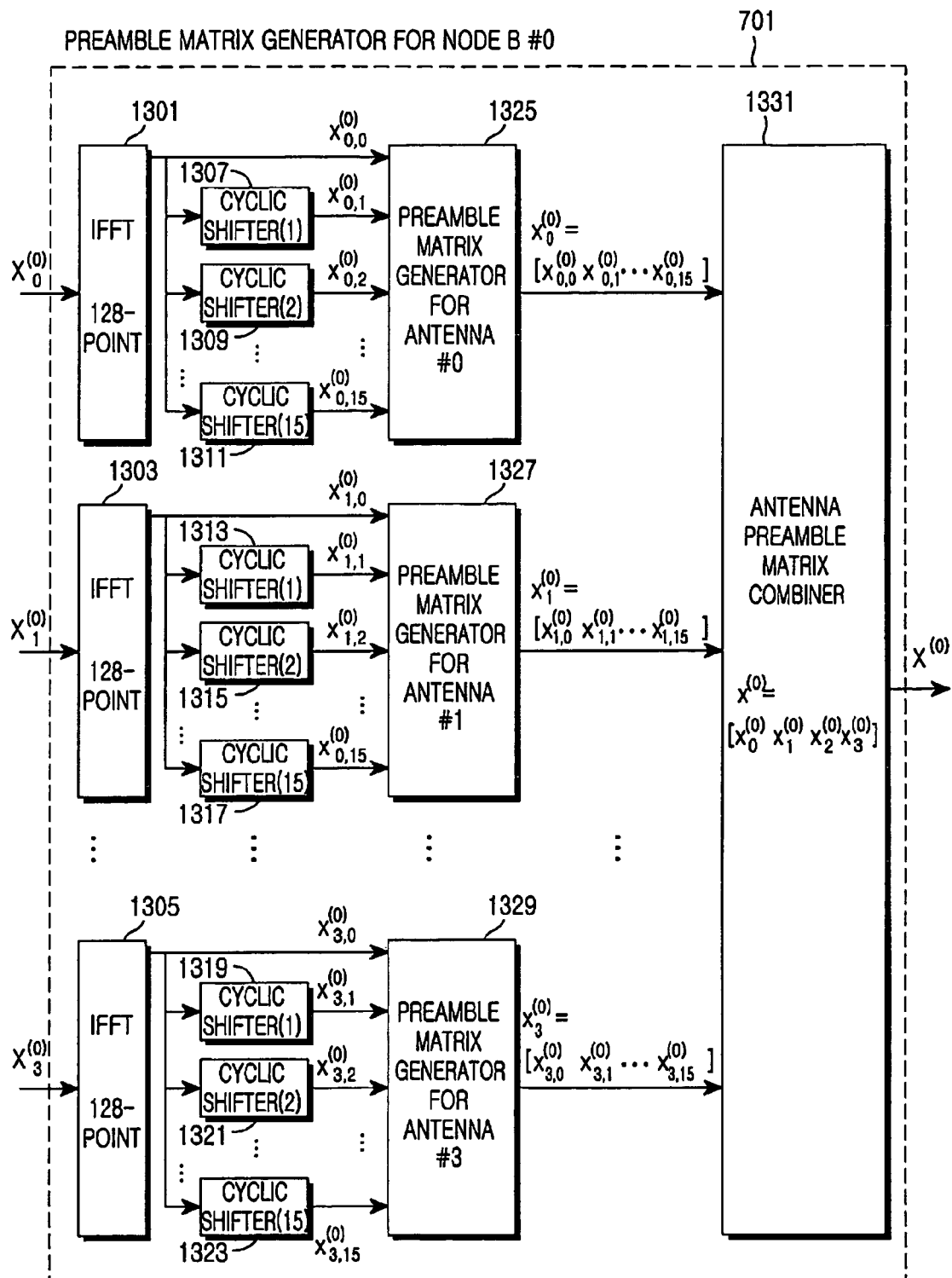
FIG. 13 illustrates an operation of a preamble matrix generator for Node B #0 when a preamble length is 128, the number of transmit antennas is 4, and the number of multiple paths is 16.

FIG. 13 illustrates an operation of the preamble matrix generator 701 for Node B #0 when A=128, N=4, and L=16. Referring to FIG. 13, a 128-point IFFT 1301 generates a time-domain signal $x_{0,0}^{(0)}$ by IFFT-processing a preamble signal $X_0^{(0)}$ for transmit antenna #0. $x_{0,0}^{(0)}$ is input to a preamble matrix generator 1325 for antenna #0 and cyclic shifters 1307 to 1311. The cyclic shifters 1307 to 1311 are used to acquire multi-path signals, not including a signal from the earliest path. Accordingly, the number of the cyclic shifters is less than L by 1. The multi-path signals can be acquired simultaneously using a plurality of cyclic shifters as in this case, or can be sequentially acquired using a single cyclic shifter, changing the number of shifts.

The cyclic shifter 1307 cyclically shifts $x_{0,0}^{(0)}$ once and outputs the resulting signal $x_{0,1}^{(0)}$ to the preamble matrix generator 1325 for antenna #0. The cyclic shifter 1309 cyclically shifts $x_{0,0}^{(0)}$ twice and outputs the resulting signal $x_{0,2}^{(0)}$ to the preamble matrix generator 1325 for antenna #0. Finally, the cyclic shifter 1311 cyclically shifts $x_{0,0}^{(0)}$ 15 times and outputs the resulting signal $x_{0,15}^{(0)}$ to the preamble matrix generator 1325 for antenna #0.

The preamble matrix generator 1325 for antenna #0 generates a preamble matrix for antenna #0, $x_0^{(0)}=[x_{0,0}^{(0)} x_{0,1}^{(0)} \ldots x_{0,15}^{(0)}]$ by combining the outputs of the IFFT processor 1301 and the cyclic shifters 1307 to 1311. The preamble matrix for antenna #0 is shown in Equation (8).

$$x_0^{(0)} = [x_{0,0}^{(0)} \ x_{0,1}^{(0)} \ \ldots \ x_{0,15}^{(0)}] \tag{8}$$

$$= \begin{bmatrix} x_0^{(0)}(0) & x_0^{(0)}(127) & \cdots & x_0^{(0)}(113) \\ x_0^{(0)}(1) & x_0^{(0)}(0) & \cdots & x_0^{(0)}(114) \\ \vdots & \vdots & \ddots & \vdots \\ x_0^{(0)}(127) & x_0^{(0)}(126) & \cdots & x_0^{(0)}(112) \end{bmatrix}$$

Similarly, a preamble matrix generator 1327 for antenna #1 generates a preamble matrix for antenna #1, $x_1^{(0)} = x_{1,0}^{(0)} [x_{1,0}^{(0)} \; x_{1,1}^{(0)} \; \ldots \; x_{1,15}^{(0)}]$, a preamble matrix generator for antenna #2 (not shown) generates a preamble matrix for antenna #2, $x_2^{(0)} = [x_{2,0}^{(0)} \; x_{2,1}^{(0)} \; \ldots \; x_{2,15}^{(0)}]$, and a preamble matrix generator 1305 for antenna #3 generates a preamble matrix for antenna #3, $x_3^{(0)} = [x_{3,0}^{(0)} \; x_{3,1}^{(0)} \; \ldots \; x_{3,15}^{(0)}]$.

An antenna preamble matrix combiner 1331 generates a preamble matrix for Node B #0, $x^{(0)} = [x_0^{(0)} \; x_1^{(0)} \; x_2^{(0)} \; x_3^{(0)}]$ by combining the four antenna preamble matrices received from the four antenna preamble matrix generators 1325 to 1329. The preamble matrix generators 703 to 709 for the other Node Bs, as illustrated in FIG. 7, generate preamble matrices for the respective Node Bs in the same manner. Accordingly, multipath propagation is considered in generating a preamble matrix for a Node B.

Figure 14:
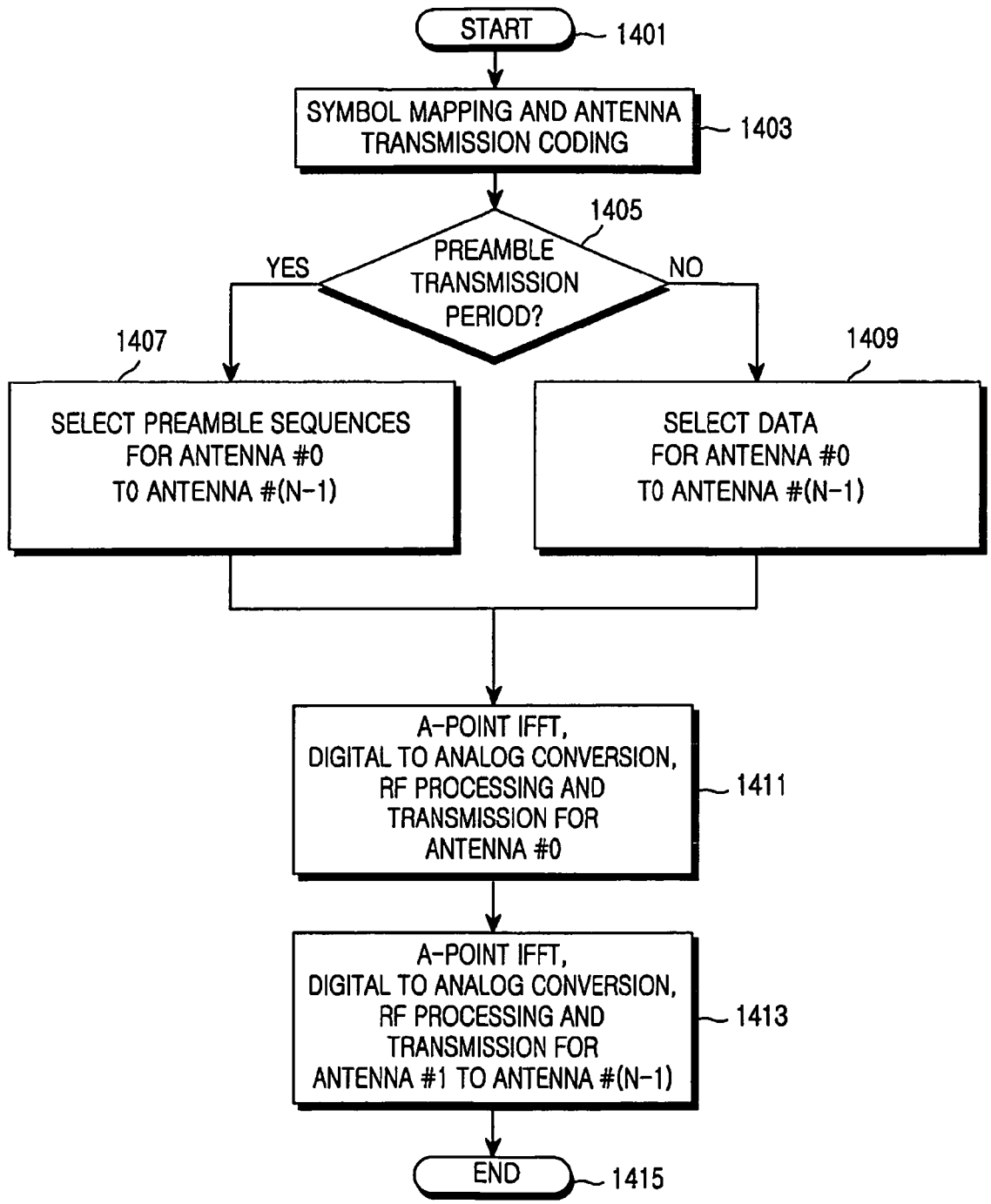
FIG. 14 is a flowchart illustrating an operation of a transmitter using N transmit antennas in an OFDM communication system according to an embodiment of the present invention.

FIG. 14 is a flowchart illustrating an operation of a transmitter using N transmit antennas in the OFDM communication system according to an embodiment of the present invention. Referring to FIG. 14, the transmitter generates B×N symbols to be transmitted through N transmit antennas, and generates N data signals by encoding the B×N symbols in a predetermined coding method in step 1403. The B×N symbols are signals produced by coding and modulating an information bit stream in a predetermined coding and modulation scheme.

In step 1405, the transmitter determines if it is time to transmit preamble sequences. If it is time to transmit preamble sequences, the transmitter selects N predetermined preamble sequences between the N data signals and the N preamble sequences. However, if it is not time to transmit preamble sequences, the transmitter selects the N data signals in step 1409.

In steps 1411 and 1413, the transmitter transmits the N data signals or the N preamble signals through the N antennas. More specifically, the transmitter IFFT-processes a signal to be transmitted through antenna #0, serial converts the IFFT signals, converts the serial signal to an analog signal, RF-processes the analog signal, and transmits the RF signal through antenna #0. Additionally, the transmitter IFFT-processes a signal to be transmitted through antenna #1, serial converts the IFFT signals, converts the serial signal to an analog signal, RF-processes the analog signal, and transmits the RF signal through antenna #1. Accordingly, the transmitter IFFT-processes each of signals to be transmitted through the N respective antennas, serial converts the IFFT signals, converts the serial signal to an analog signal, RF-processes the analog signal, and transmits the RF signal through a corresponding antenna.

Figure 15:
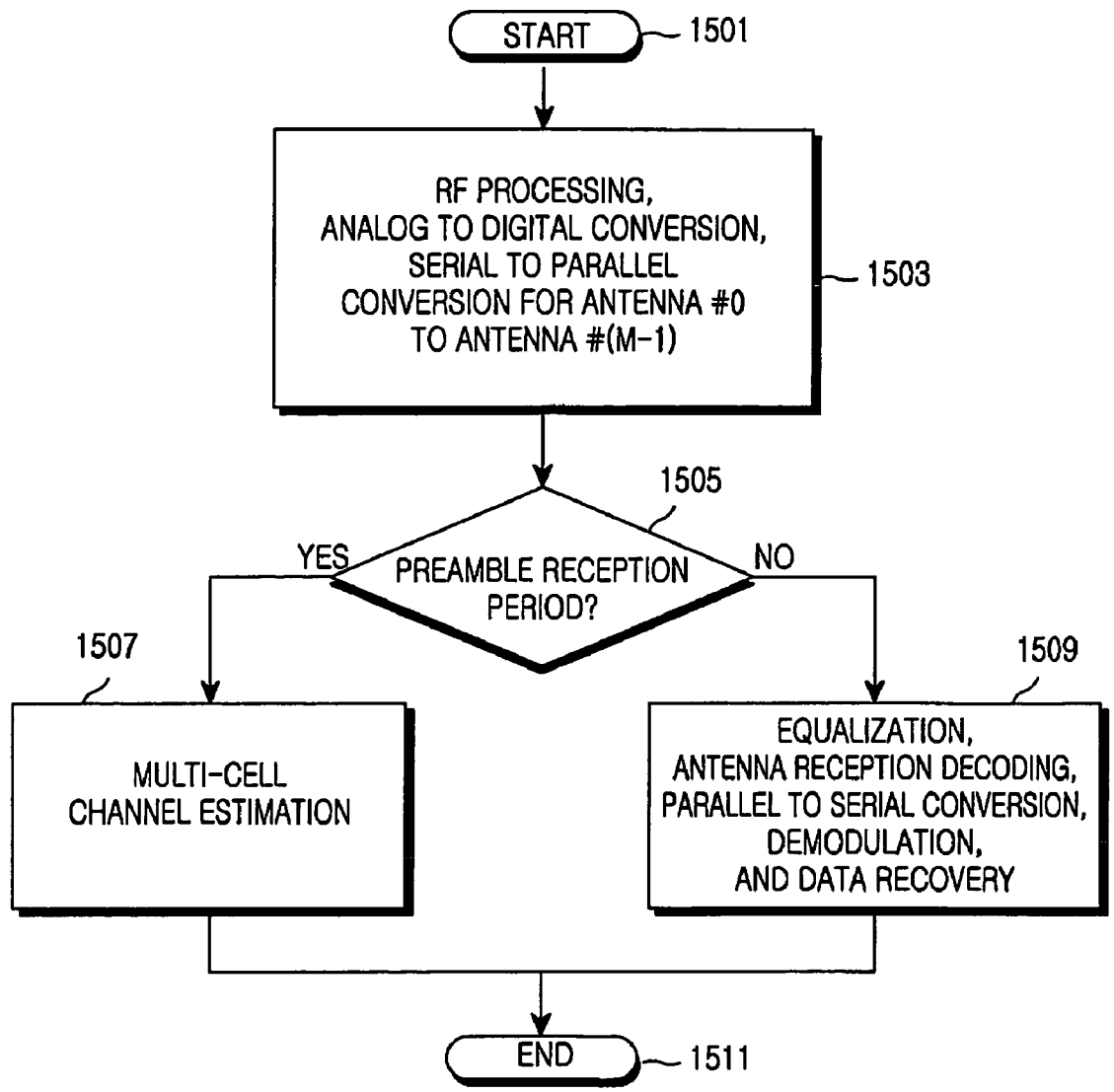
FIG. 15 is a flowchart illustrating an operation of a receiver using M receive antennas in an OFDM communication system according to an embodiment of the present invention.

FIG. 15 is a flowchart illustrating an operation of a receiver using M receive antennas in an OFDM communication system according to an embodiment of the present invention. Referring to FIG. 15, the receiver acquires M time-domain input signals by RF-processing a signal received through the M antennas, converting it to a digital signal, and parallel converting the digital signal in step 1503.

In step 1505, the receiver determines if it is time to receive preamble signals. If it is time to receive the preamble sequences, the receiver performs a multi-cell channel estimation on the M input signals. The resulting channel estimates are provided to the equalizers for the respective antennas, for use in demodulating the input signals.

However, if it is not time to receive the preamble sequences, the receiver FFT-processes the M input signals, channel-compensates the FFT signals with the channel estimates, and decodes the M channel-compensated signals in a predetermined method, thereby producing one signal stream in step 1509. The receiver then recovers the original information bit stream by serializing the antenna signal and demodulating the serial signal.

Figure 16:
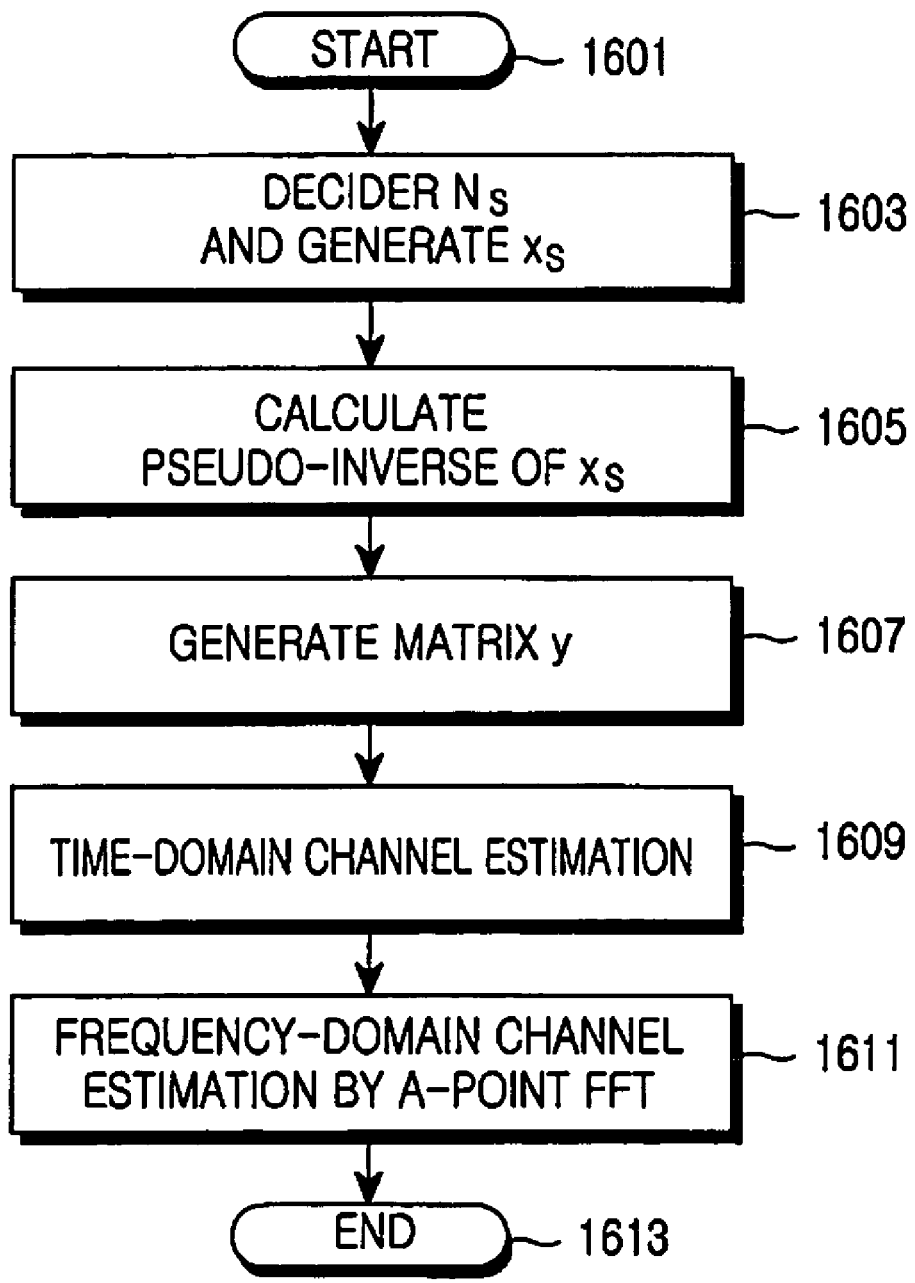
FIG. 16 is a detailed flowchart illustrating a multi-cell estimation step as illustrated in FIG. 15.

FIG. 16 is a detailed flowchart illustrating a multi-cell estimation step 1507 as illustrated in FIG. 15. Referring to FIG. 16, the receiver calculates a maximum number of accommodatable Node Bs, $N_S$, selects $N_S$ preamble matrices according to reception power among known preamble matrices of a serving Node B and its neighboring Node Bs, and generates a multi-cell preamble matrix $x_S$ using the $N_S$ preamble matrices in step 1603.

In step 1605, the receiver calculates the pseudo-inverse of $x_S$, $(x_S^H x_S)^{-1} x_S^H$. The receiver generates a received signal matrix y by combining M signals received through the M antennas, $y_0, y_1, \ldots, y_{M-1}$ in step 1607.

In step 1609, the receiver multiplies y by $(x_S^H x_S)^{-1} x_S^H$, thereby producing a channel estimate $\hat{h}$. The receiver obtains a frequency-domain channel estimate $\hat{H}$ by A-point FFT-processing $\hat{h}$ in step 1611.

Figure 17:
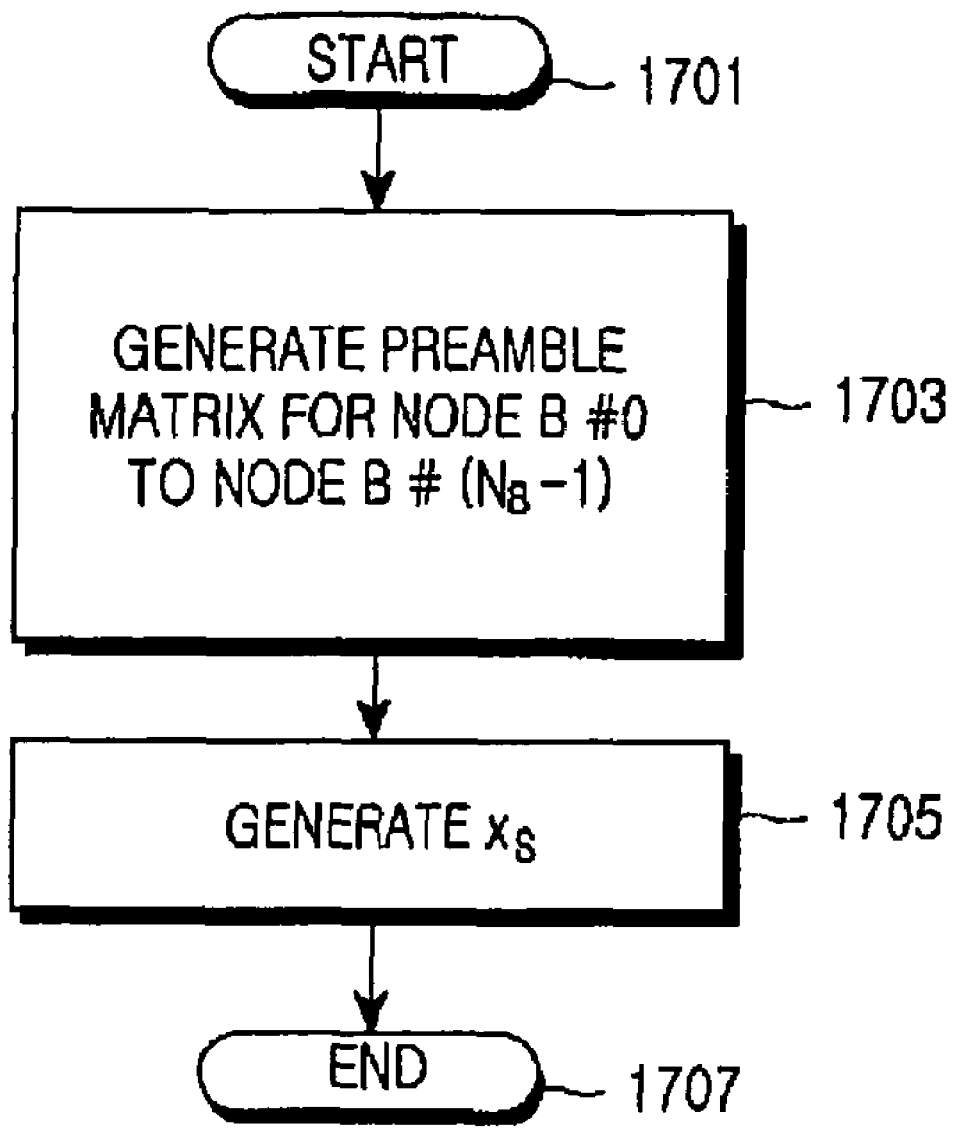
FIG. 17 is a detailed flowchart illustrating a multi-cell preamble matrix generation step as illustrated in FIG. 16.

FIG. 17 is a detailed flowchart illustrating a multi-cell preamble matrix generation step 1603 as illustrated in FIG. 16. Referring to FIG. 17, in step 1703, the receiver generates a preamble matrix for Node B #0, $x^{(0)}$ using known frequency-domain preamble information associated with Node B #0. Accordingly, the receiver generates time-domain preamble matrices for Node Bs #1 to #($N_B$-1).

In step 1705, the receiver selects $N_S$ Node B preamble matrices according to reception power among the $N_B$ Node B preamble matrices, and generates the multi-cell preamble matrix $x_S$.

Figure 18:
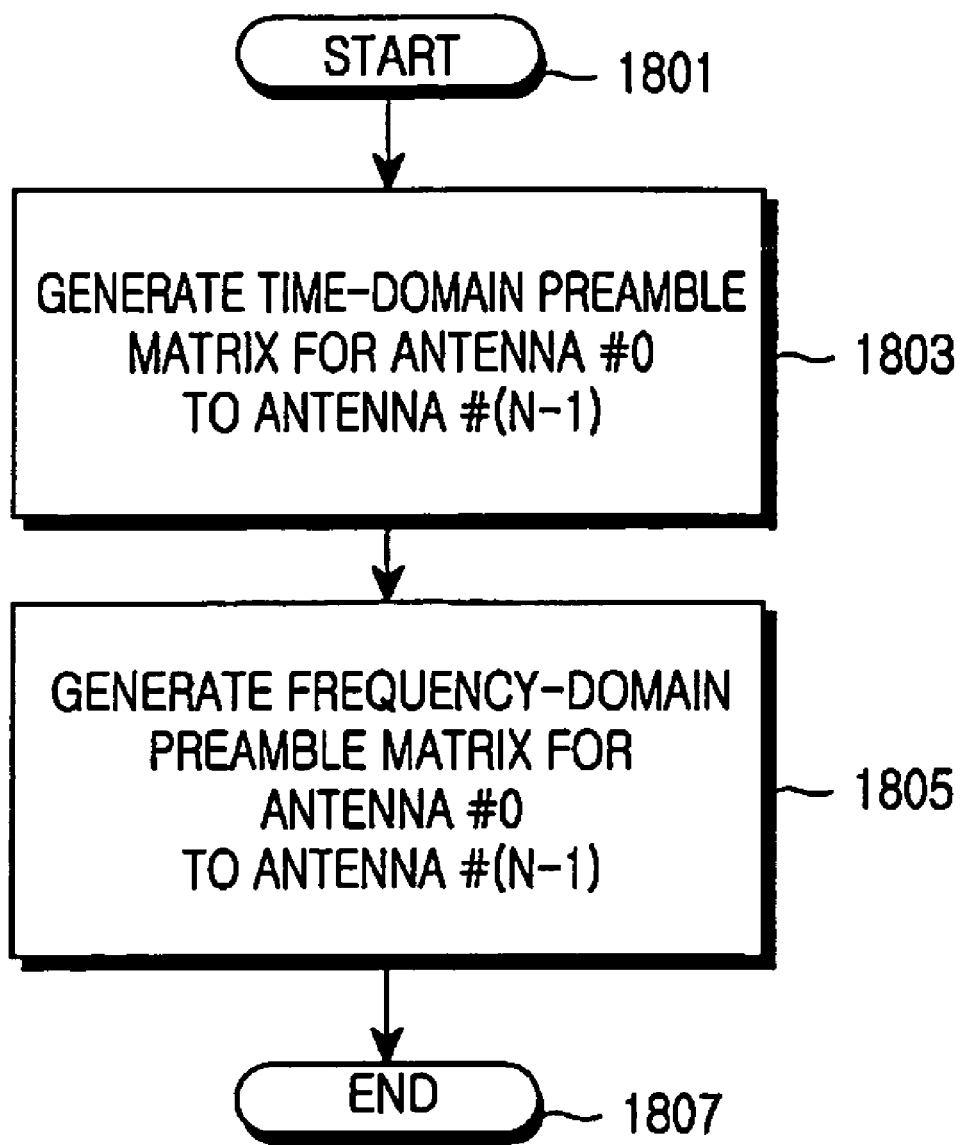
FIG. 18 is a detailed flowchart illustrating a Node B preamble matrix generation step 1703 as illustrated in FIG. 17.

FIG. 18 is a detailed flowchart illustrating a Node B preamble matrix generation step 1703 as illustrated in FIG. 17. Referring to FIG. 18, in step 1803, the receiver generates a time-domain signal $x_{0,0}^{(0)}$ by IFFT-processing a known preamble signal $X_0^{(0)}$ for transmit antenna #0 and then generates (L-1) time-domain signals by cyclically shifting $x_{0,0}^{(0)}$ once to (L-1) times. In step 1805, the receiver generates a preamble matrix for Node B #0 by combining $x_{0,0}^{(0)}$ with the (L-1) cyclically-shifted signals. Similarly, preamble matrices are generated for the other Node Bs.

Now the performance of the multi-cell channel estimator according to the present invention will be evaluated in the following graphical representations.

Figure 19:
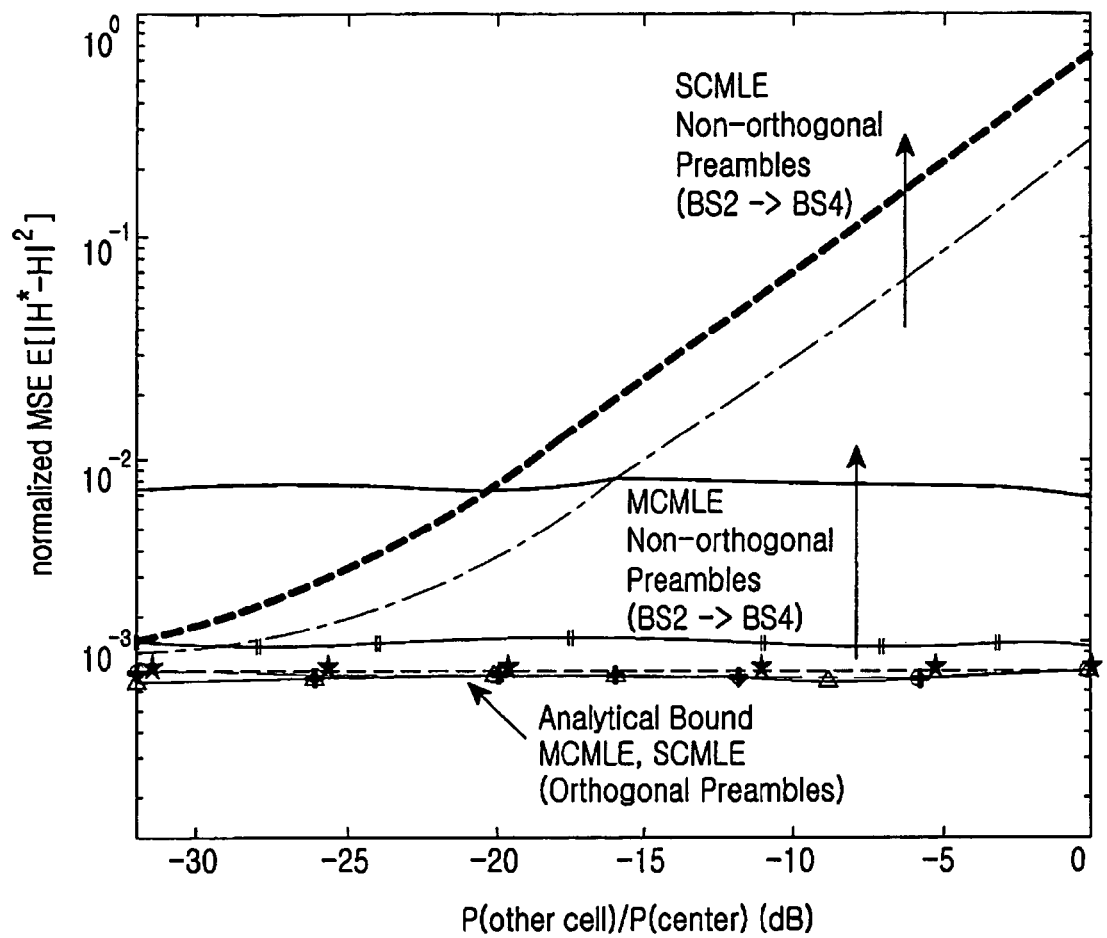
FIG. 19 is a graph illustrating a comparison in performance between an SCMLE (Single Cell Maximum Likelihood Estimator) and an MCMLE (Multi-Cell Maximum Likelihood Estimator) according to the total number of a serving Node B and its neighboring Node Bs.

FIG. 19 is a graph illustrating a comparison in performance between an SCMLE (Single Cell Maximum Likelihood Estimator) and an MCMLE (Multi-Cell Maximum Likelihood Estimator) according to the total number of a serving Node B and its neighboring Node Bs. The SCMLE represents a single cell maximum likelihood estimator, as conventionally used, and the MCMLE represents a multi-cell maximum likelihood estimator. The performance of the MCMLE according to the present invention is evaluated in a system using 128 subcarriers, when the number of Node Bs varies from 1 to 2 and 4.

As noted from FIG. 19, when preambles are generated in the procedures described with reference to FIGS. 3 and 4, i.e., when orthogonal preambles are used, the SCMLE and the MCMLE both perform equally. Given non-orthogonal preambles, performance degradation is observed as the number of Node Bs increases. For the conventional SCMLE, severe inter-cellular interference significantly increases MSE (Mean Squared Error), whereas the MCMLE has the same performance despite the increase of inter-cellular interference. However, a different tendency will be shown if $N_B$ is less than $N_S$.

Figure 20:
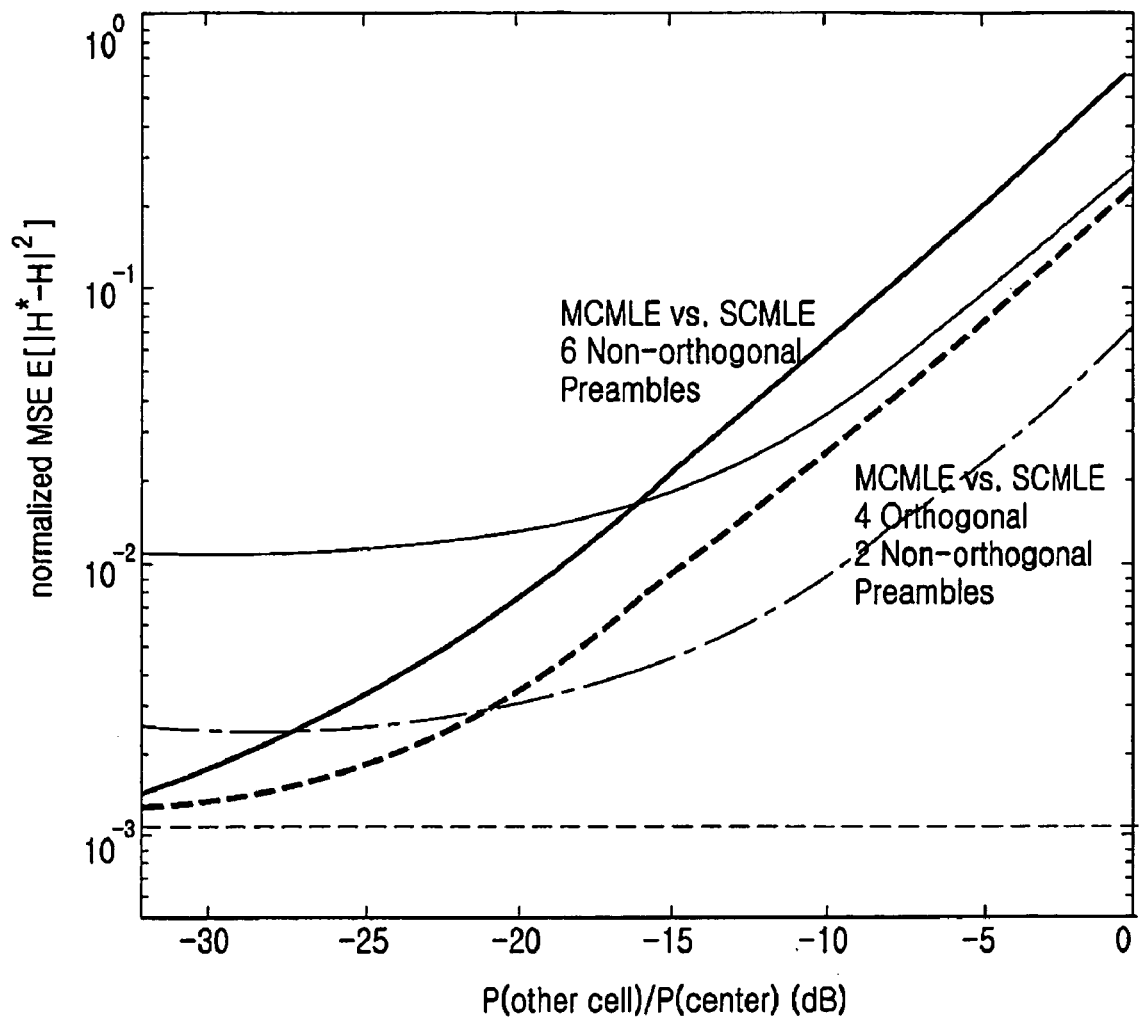
FIG. 20 is a graph illustrating another comparison in performance between the SCMLE and the MCMLE according to the total number of a serving Node B and its neighboring Node Bs.

FIG. 20 is a graph illustrating another comparison in performance between the SCMLE and the MCMLE according to the total number of a serving Node B and its neighboring Node Bs. In FIG. 20, the number of accommodatable Node Bs is 4, which is less than that of a serving Node B and its neighboring Node Bs, which is 6. Four of six preambles are orthogonal and the other two preambles are non-orthogonal, thereby causing interference. As illustrated in FIG. 20, the SCMLE significantly suffers from the interference, while the MCMLE outperforms the SCMLE.

In accordance with the present invention as described above, the use of a multi-cell estimation method, which removes inter-cellular interference, enables more accurate channel estimation and increases data demodulation performance as well in an OFDM communication system.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for channel estimation using preamble signals received from a serving Node B and neighboring Node Bs in a user equipment (UE) in a broadband wireless communication system in which each of the Node Bs transmits a signal through N antennas and the UE receives a signal through M antennas, where N and M are each greater than or equal to one, the apparatus comprising:
   a Node B number decider for calculating a maximum number $N_S$ of channel-estimatable Node Bs using a preamble length, a number of antennas in each of the Node Bs, and a number of multiple paths;
   a multi-cell preamble matrix generator for generating a multi-cell preamble matrix $x_S$ by generating a Node B preamble matrix for each of the serving Node B and the neighboring Node Bs and selecting $N_S$ Node B preamble matrices according to reception power among the generated Node B preamble matrices; and
   a channel estimator for performing the channel estimation using the multi-cell preamble matrix $x_s$ and M signals received through the M antennas during a preamble receiving period.

2. The apparatus of claim 1, wherein the maximum number of channel-estimatable Node Bs, $N_s$, is calculated by $$N_S = \left\lfloor \frac{A}{LN} \right\rfloor$$

where A is the preamble length, L is the number of multiple paths, and N is the number of antennas in each of the Node Bs.

3. The apparatus of claim 1, wherein the maximum number of channel-estimatable Node Bs, $N_s$, is calculated by $$N_S = \min\left(\left\lfloor \frac{A}{LN} \right\rfloor, N_B\right)$$

where A is the preamble length, L is the number of multiple paths, N is the number of antennas in each of the Node Bs, and $N_B$ is the number of the serving Node B and the neighboring Node Bs.

4. The apparatus of claim 1, wherein the number of multiple paths, L is equal to a number of cyclic prefix (CP) samples.

5. The apparatus of claim 1, wherein the preamble length is equal to a number of samples of an orthogonal frequency division multiplexing (OFDM) symbol.

6. The apparatus of claim 1, wherein the channel estimator comprises:
   a first matrix generator for generating a received signal matrix y by combining the M signals received through the M antennas for the preamble receiving period;
   a second matrix generator for generating the pseudo-inverse of the multi-cell preamble matrix $x_S$;
   a matrix multiplier for calculating a time-domain channel estimate ĥ by multiplying the received signal matrix y by the pseudo-inverse of the multi-cell preamble matrix $x_s$; and
   a fast-Fourier-transform (FFT) processor for calculating a frequency-domain channel estimate Ĥ by FFT-processing the time-domain channel estimate ĥ.

7. The apparatus of claim 6, wherein the pseudo-inverse of $x_S$ is $(x_S^H x_S)^{-1} x_S^H$.

8. The apparatus of claim 1, wherein the multi-cell preamble matrix generator comprises:
   a plurality of Node B preamble matrix generators for generating Node B preamble matrices for the serving Node B and the neighboring Node Bs using known preamble information of the serving Node B and the neighboring Node Bs, using account multi-path propagation; and
   an accommodatable Node B matrix generator for generating the multi-cell preamble matrix $x_S$ by selecting the $N_S$ Node B preamble matrices according to reception power among the generated Node B preamble matrices.

9. The apparatus of claim 8, wherein each of the Node B preamble matrix generators comprises:
   an inverse-fast-Fourier-transform (IFFT) unit for generating time-domain signals by IFFT-processing known preamble signals associated with antennas of a Node B;
   a cyclic shifting unit for cyclically shifting each of the outputs of the IFFT unit in a range of one to (the number of multiple paths–1) times;
   an antenna preamble matrix generation unit for generating antenna preamble matrices by combining the outputs of the IFFT unit with the outputs of the cyclic shifting unit according to the respective transmit antennas; and
   an antenna preamble matrix combiner for generating a Node B preamble matrix by combining the antenna preamble matrices.

10. The apparatus of claim 8, wherein each of the Node B preamble matrix generators comprises:
    a cyclic shifting unit for reading preamble sample data associated with the antennas of a Node B from a memory and cyclically shifting each of the preamble sample data in e a range of one to (the number of multiple paths–1) times;
    an antenna preamble matrix generation unit for generating antenna preamble matrices by combining the preamble sample data with the outputs of the cyclic shifting unit according to the respective transmit antennas; and
    an antenna preamble matrix combiner for generating a Node B preamble matrix by combining the antenna preamble matrices.

11. A method of channel estimation using preamble signals received from a serving Node B and neighboring Node Bs in a user equipment (UE) in a broadband wireless communication system in which each of the Node Bs transmits a signal through N antennas and the UE receives a signal through M antennas, where N and M are each greater than or equal to one, the method comprising the steps of:
    calculating a maximum number $N_S$ of channel-estimatable Node Bs using a preamble length, a number of antennas in each of the Node Bs, and a number of multiple paths;

selecting $N_S$ Node Bs according to the reception power of the serving Node B and the neighboring Node Bs;

generating Node B preamble matrices for the respective selected $N_S$ Node Bs;

generating a multi-cell preamble matrix $x_S$ by combining the $N_S$ Node B preamble matrices; and performing the channel estimation using the multi-cell preamble matrix $x_S$ and M signals received through the M antennas during a preamble receiving period.

12. The method of claim 11, wherein the maximum number of channel-estimatable Node Bs, $N_S$, is calculated by $$N_S = \left\lfloor \frac{A}{LN} \right\rfloor$$

where A is the preamble length, L is the number of multiple paths, and N is the number of antennas in each of the Node Bs.

13. The method of claim 11, wherein the maximum number of channel-estimatable Node Bs, $N_S$, is calculated by $$N_S = \min\left(\left\lfloor \frac{A}{LN} \right\rfloor, N_B\right)$$

where A is the preamble length, L is the number of multiple paths, N is the number of antennas in each of the Node Bs, and $N_B$ is the number of the serving Node B and the neighboring Node Bs.

14. The method of claim 11, wherein the number of multiple paths L is equal to a number of cyclic prefix (CP) samples.

15. The method of claim 11, wherein the preamble length is equal to a number of samples of an orthogonal frequency division multiplexing (OFDM) symbol.

16. The method of claim 11, wherein the step of performing the channel estimation comprises the steps of:

generating a received signal matrix y by combining the M signals received through the M antennas for the preamble receiving period;

calculating a pseudo-inverse of the multi-cell preamble matrix $x_S$;

calculating a time-domain channel estimate $\hat{h}$ by multiplying the received signal matrix y by the pseudo-inverse of the multi-cell preamble matrix $x_S$; and calculating a frequency-domain channel estimate $\hat{H}$ by FFT-processing the time-domain channel estimate $\hat{h}$.

17. The method of claim 16, wherein the pseudo-inverse of $x_S$ is $(x_S^H x_S)^{-1} x_S^H$.

18. The method of 11, wherein the step of generating the multi-cell preamble matrix comprises the steps of:

selecting the $N_S$ Node Bs according to the reception power of the serving Node and the neighboring Node Bs;

generating Node B preamble matrices for the $N_S$ Node Bs using known preamble information of the $N_S$ Node Bs, using multi-path propagation; and generating the multi-cell preamble matrix $x_S$ by combining the $N_S$ Node B preamble matrices.

19. The method of claim 18, wherein the step of generating the Node B preamble matrix comprises the steps of:

generating time-domain signals by IFFT-processing known preamble signals associated with the antennas of each of the $N_S$ Node Bs;

generating multi-path signals by cyclically shifting each of the $N_S \times N$ time-domain signals in a range of one to (the number of multiple paths−1) times;

generating antenna preamble matrices by combining the $N_S \times N$ time-domain signals with the multi-path signals according to the respective transmit antennas; and generating the $N_S$ Node B preamble matrices by combining the antenna preamble matrices according to the respective Node Bs.

20. The method of claim 18, wherein the step of generating the Node B preamble matrix comprises the steps of:

reading $N_S \times N$ preamble sample data associated with the $N_S$ Node Bs from a memory;

generating multi-path sample data by cyclically shifting each of the preamble sample data in a range of one to (the number of multiple paths−1) times;

generating antenna preamble matrices by combining the preamble sample data with the multi-path sample data according to the respective transmit antennas; and generating the $N_S$ Node B preamble matrices by combining the antenna preamble matrices according to the respective Node Bs.

* * * * *